US012050319B2

(12) United States Patent
Teng et al.

(10) Patent No.: US 12,050,319 B2
(45) Date of Patent: Jul. 30, 2024

(54) OPTICAL-WAVEGUIDE DISPLAY MODULE WITH MULTIPLE LIGHT SOURCES

(71) Applicant: SUN YAT-SEN UNIVERSITY, Guangdong (CN)

(72) Inventors: Dongdong Teng, Guangdong (CN); Lilin Liu, Guangdong (CN)

(73) Assignee: SUN YAT-SEN UNIVERSITY, Guangdong (CN)

( * ) Notice: Subject to any disclaimer, the term of this patent is extended or adjusted under 35 U.S.C. 154(b) by 514 days.

(21) Appl. No.: 17/460,343

(22) Filed: Aug. 30, 2021

(65) Prior Publication Data
US 2023/0061336 A1    Mar. 2, 2023

(51) Int. Cl.
G02B 27/01    (2006.01)

(52) U.S. Cl.
CPC ..... *G02B 27/0172* (2013.01); *G02B 27/0179* (2013.01); *G02B 2027/0123* (2013.01); *G02B 2027/0187* (2013.01)

(58) Field of Classification Search
CPC ............ G02B 27/0172; G02B 27/0179; G02B 2027/0123
USPC ........................................................ 359/630
See application file for complete search history.

(56) References Cited

U.S. PATENT DOCUMENTS

| 2019/0204600 A1 | 7/2019 | Ha et al. |
| 2021/0174765 A1* | 6/2021 | Woodgate ............ G02B 6/0066 |
| 2021/0223462 A1 | 7/2021 | Liu et al. |

FOREIGN PATENT DOCUMENTS

WO    2017186020    11/2017

OTHER PUBLICATIONS

Dongdong Teng, et al., "Three-Dimensional Display Method Based on Spatial Superposition of Sub-Pixels' Emitted Beams", Unpublished U.S. Appl. No. 17/226,093, filed Apr. 9, 2021.

* cited by examiner

*Primary Examiner* — Jerry L Brooks
(74) *Attorney, Agent, or Firm* — JCIPRNET

(57) ABSTRACT

The invention discloses an optical-waveguide display module with multiple light sources, including a light-source array of timing-orthogonal-characteristic, a relay device, a display device of orthogonal-characteristic, an optical waveguide device, a converging device, a control device, and other components. The light-source array of timing-orthogonal-characteristic includes more than one orthogonal-characteristic light sources. All orthogonal-characteristic light sources are switched on and off in each time cycle sequentially, with only one orthogonal-characteristic light source being switched on at a time-point of each time cycle. By designing the spatial distribution of converging spots of lights from different orthogonal-characteristic light sources, one two-dimensional image is projected into the pupil of the viewer in each time cycle, which realizes VAC-free three-dimensional display based on Maxwellian view technology or More-than-one-view-one-pupil technology.

34 Claims, 21 Drawing Sheets

OPTICAL-WAVEGUIDE DISPLAY MODULE WITH MULTIPLE LIGHT SOURCES

TECHNICAL FIELD

The present invention relates to the field of three-dimensional display technology, and more particularly to an optical-waveguide display module with multiple light sources.

BACKGROUND

Compared with the traditional two-dimensional display, the three-dimensional display can provide high dimensional information and is attracting great attention. The existing three-dimensional display technology mainly gets implemented by only binocular parallax, with two two-dimensional images of the displayed scene projected to the viewer's two eyes, respectively. In this process, the intersection of the two eye's viewing directions triggers the viewer's depth perception. In order to see the corresponding two-dimensional image clearly, each eye needs to keep focusing on the display screen. Thus, an inconsistency exists between the monocular focusing depth and the binocular convergence depth, which is called as Vergence-Accommodation Conflict (VAC). Under natural condition, when observing a real three-dimensional scene, the monocular focusing depth and the binocular convergence depth are consistent. The VAC is contrary to the human's physiological habits, and results in visual discomfort when the viewer observes a three-dimensional scene displayed by only binocular parallax. Maxwellian view (US20190204600A1, AUGMENTED REALITY OPTICS SYSTEM WITH PINPOINT MIRROR) and More-than-one-view-one-pupil (PCT/CN2017/080874, THREE-DIMENSIONAL DISPLAY SYSTEM BASED ON DIVISION MULTIPLEXING OF VIEWER'S ENTRANCE-PUPIL AND DISPLAY METHOD) are two technical paths solving the problem of VAC. For More-than-one-view-one-pupil technology, more than one two-dimensional image of the display scene are projected to each pupil of the viewer. Thus, for a displayed spatial point, more than one passing-through light beams from corresponding more than one two-dimensional image reach into the pupil along different directions, and the overlapping of these passing-through beams attracts the focus of the corresponding eye to the displayed spatial point for VAC-free display. The Maxwellian view technology designs the light beam from each pixel has a small light-intensity gradient along the propagation direction, for enhancing the attractiveness of the out-of-the-display-plane light spot to the viewer's focus. Then, driven by the binocular convergence, the eyes can focus at the binocular convergence depth within a certain depth range naturally.

SUMMARY

The present invention provides an optical-waveguide display module with multiple light sources, which can be taken as an eyepiece for VAC-free three-dimensional display system. The optical-waveguide display module with multiple light sources includes a light-source array of timing-orthogonal-characteristic or a light-source array of timing-characteristic, a relay device, a display device of orthogonal-characteristic or an ordinary display device, an optical waveguide device, a converging device, a control device, and other component structures. Among them, the light-source array of timing-orthogonal-characteristic or the light-source array of timing-characteristic includes more than one orthogonal-characteristic light sources or more than one ordinary light sources. All orthogonal-characteristic light sources or all ordinary light sources are switched on and off in each time cycle sequentially, with only one orthogonal-characteristic light source or ordinary light source being turned on at a time-point of each time cycle. The light from the light-source array of timing-orthogonal-characteristic or the light-source array of timing-characteristic gets divergence decreased by the relay device and then incidents into the display device of orthogonal-characteristic or the ordinary display device. Modulated light from the display device of orthogonal-characteristic or the ordinary display device is converged to the observing zone by the optical waveguide device, the converging device, and other component structures working together. Design the distribution of the converging spots of the lights from different orthogonal-characteristic light sources or ordinary light sources, thus to project at least one two-dimensional image of the displayed scene into the pupil, for VAC-free display based on More-than-one-view-one-pupil technology or/and Maxwellian view technology.

In order to overcome VAC problem through the technology routes of Maxwellian view or/and More-than-one-view-one-pupil, a thin and slight optical waveguide device is designed to guide two-dimensional images to the observing zone for the pupil. The present invention provides the following solutions.

An optical-waveguide display module with multiple light sources, it comprises:
  a light-source array of timing-orthogonal-characteristic comprised of M orthogonal-characteristic light sources, which are switched on and off sequentially at M time-points of each time cycle, with only one orthogonal-characteristic light source being switched on at a time-point, where $M \geq 2$;
  wherein each orthogonal-characteristic light source is composed of L sub-light sources, which have a one-to-one correspondence with L kinds of orthogonal characteristics, and a sub-light source only emits light of corresponding orthogonal characteristic, where $L \geq 2$;
  a relay device, which is designed to modulate the light from the light-source array of timing-orthogonal-characteristic, for reducing divergence of the light beam from each sub-light source;
  a display device of orthogonal-characteristic comprising multiple pixels, which modulates the light from the relay device with optical information;
  wherein the pixels or subpixels of the display device of orthogonal-characteristic are divided into L pixel-groups or L subpixel-groups, with all the L pixel-groups or all the L subpixel-groups taking a one-to-one correspondence with the L sub-light sources of each orthogonal-characteristics light source, and each pixel-group or each subpixel-group blocking light from non-corresponding sub-light source;
  an optical waveguide device, which guides light from the display device of orthogonal-characteristic;
  a converging device, for converging light from the optical waveguide device to the observing zone of a pupil of a viewer;
  a control device, which is connected with the light-source array of timing-orthogonal-characteristic and the display device of orthogonal-characteristic, for controlling the sequential switching of the orthogonal-characteristic light sources and the synchronous refreshing of optical information loaded onto the display device of orthogonal-characteristic;

wherein a pixel or a subpixel of the display device of orthogonal-characteristic projects at most one beam of light into the pupil of the viewer at a time-point, with the optical information refreshed synchronously by said pixel or said subpixel being a projection information of a displayed scene along its light beam projected into the pupil.

Preferably, the optical waveguide device comprises a wave-guide body, an entrance pupil, a couple-in element, reflecting surfaces, a couple-out element, and an exit pupil;
wherein the light from the display device of orthogonal-characteristic enters the wave-guide body through the entrance pupil; then, guided by the couple-in element and reflected by the reflecting surfaces, the light propagates in the wave-guide body toward the couple-out element; the couple-out element guides the light from each sub-light source to exit the wave-guide body through the exit pupil along a corresponding direction.

Preferably, the sub-light sources are linear-shaped, and the number of light beams projected into the pupil in a time cycle is not less than the pixel number of two pixel-groups or the subpixel number of two subpixel-groups, under a premise that all pixels or all subpixels are loaded with optical information.

Preferably, the sub-light sources are point-shaped, and the number of light beams projected into a pupil in a time cycle is not less than the pixel number of one pixel-group or the subpixel number of one subpixel-group under a premise that all pixels or all subpixels are loaded with optical information.

Preferably, the converging device is integrated into the optical waveguide device.

Preferably, the optical-waveguide display module with multiple light sources further comprises an auxiliary relay device, which is inserted into the light path to modulate the incident light of the optical waveguide device.

Preferably, the auxiliary relay device is a zooming in/out element, for adjusting the projection size of the light from the display device of orthogonal-characteristic.

Preferably, the auxiliary relay device is a filter module, which projects the spectral plane of the display device of orthogonal-characteristic and performs filtering on the spectral plane.

Preferably, the auxiliary relay device is a guiding device, which guides the light from the display device of orthogonal-characteristic to the couple-in element of the optical waveguide device.

Preferably, the optical-waveguide display module with multiple light sources comprises a compensation unit, which is designed to eliminate the effect of the converging device on the incident light from the external environment.

Preferably, the optical-waveguide display module with multiple light sources further comprises a tracking device connected to the control device, for tracking the spatial position of the pupil.

Preferably, according to the real-time spatial position of the pupil, the control device switches on and off corresponding K orthogonal-characteristic light sources at K time-points of a time cycle, with the display device of orthogonal-characteristic refreshed by corresponding optical information synchronously, where 2≤K<M.

Preferably, according to the real-time spatial position of the pupil at a time-point, a corresponding orthogonal-characteristic light source is switched on by the control device, with the display device of orthogonal-characteristic refreshed by corresponding optical information synchronously.

Preferably, said M orthogonal-characteristic light sources are replaced by an orthogonal-characteristic light source and a controllable deflection device;
wherein the controllable deflection device can deflect the light from the orthogonal-characteristic light source under control of control device, to provide backlights to the display device of orthogonal-characteristic along M directions,
or the controllable deflection device can deflect the light from the display device of orthogonal-characteristic, to incident onto the entrance pupil along M directions.

Preferably, said M orthogonal-characteristic light sources and the relay device are replaced by a controllable deflection device, which can deflect the light from the display device of orthogonal-characteristic under control of the control device;
wherein a microstructure array comprising microstructures is attached to the display device of orthogonal-characteristic, with the microstructures taking a one-to-one relationship to the pixels or the subpixels for modulating exit angles and exit directions of the exiting beams;
wherein the display device of orthogonal-characteristic is an active self-luminous device, or a passive non-self-luminous device with a backlight, and the requirement of different orthogonal characteristics between different pixel-groups or different subpixel-groups are no longer mandatory.

Preferably, said M orthogonal-characteristic light sources and relay device are replaced by M filter apertures on the spectral plane, which is switched on and off sequentially by the control device at M time-points of each time cycle and only one filter aperture is switched on at a time-point;
wherein a filter aperture is composed of L sub-filter apertures which take a one-to-one correspondence with the L kinds of orthogonal characteristics, and each sub-filter aperture blocks light of non-corresponding orthogonal characteristics;
wherein the display device of orthogonal-characteristic is an active self-luminous device, or a passive non-self-luminous device with a backlight.

Preferably, said M orthogonal-characteristic light sources and the relay device are replaced by a filter aperture on the spectral plane and a controllable deflection device;
wherein the controllable deflection device can deflect the light from the filter module under control of the control device, to guide the light from the display device of orthogonal-characteristic to the entrance pupil along M directions;
wherein the display device of orthogonal-characteristic is an active self-luminous device, or a passive non-self-luminous device with a backlight.

In addition, the present invention provides the following solutions.

An optical-waveguide display module with multiple ordinary light sources comprising:
a light-source array of timing-characteristic comprising M ordinary light sources, which are switched on and off sequentially at M time-points of each time cycle, with only one ordinary light source being switched on at a time-point, where M≥2;
a relay device, which is designed to modulate the light from the light-source array of timing-characteristic, for reducing divergence of the light beam from each ordinary light source;

an ordinary display device comprising multiple pixels, which modulates the light from the relay device with optical information;

an optical waveguide device, which guide light from the ordinary display device;

a converging device, to converge the light from the optical waveguide device to the observing zone for a pupil of the viewer.

a control device, which is connected with the light-source array of timing-characteristic and the ordinary display device, to control the sequential switching of the ordinary light sources and the synchronous refreshing of optical information loaded onto the ordinary display device;

wherein a pixel of the ordinary display device projects at most one beam of light into the pupil of the viewer at a time-point, with the optical information refreshed synchronously by said pixel being the projection information of the displayed scene along its light beam projected into the pupil, and a pixel projects at least one light beam into the pupil of the viewer in each time cycle when said pixel is always loaded with optical information at all time-points.

Preferably, the optical waveguide device comprises a wave-guide body, an entrance pupil, a couple-in element, reflecting surfaces, a couple-out element, and an exit pupil;

wherein the light from the ordinary display device enters the wave-guide body through the entrance pupil; then, guided by the couple-in element and reflected by the reflecting surfaces, the light propagates in the wave-guide body toward the couple-out element; the couple-out element guides the light from each ordinary light source to exit the wave-guide body through the exit pupil along a corresponding direction.

Preferably, the ordinary light sources are linear-shaped;

wherein a pixel of the ordinary display device projects at least two light beams into the pupil of the viewer in each time cycle when this pixel is always loaded with optical information at all time-points.

Preferably, the ordinary light sources are point-shaped;

wherein under an assumption that all pixels are always loaded with optical information at all time-points, each pixel projects only one light beam into the pupil of the viewer in each time cycle for the Maxwellian view display, or, each pixel projects at least two light beams into the pupil of the viewer in each time cycle for the More-than-one-view-one-pupil display.

Preferably, the converging device is integrated into the optical waveguide device.

Preferably, the optical-waveguide display module with multiple ordinary light sources further comprises an auxiliary relay device, which is inserted into the light path to modulate the incident light of the optical waveguide device.

Preferably, the auxiliary relay device is a zooming in/out element, for adjusting the projection size of the light from the ordinary display device.

Preferably, the auxiliary relay device is a filter module which projects the spectral plane of the ordinary display device and performs filtering on the spectral plane.

Preferably, the auxiliary relay device is a guiding device, which guide the light from the ordinary display device to the couple-in element of the optical waveguide device.

Preferably, the optical-waveguide display module with multiple ordinary light sources further comprises a compensation unit, which is designed to eliminate the effect of the converging device on the incident light from the external environment.

Preferably, further comprises a tracking device connected to the control device, for tracking the spatial position of the viewer's pupil.

Preferably, according to the real-time spatial position of the pupil, the control device switches on and off the corresponding K ordinary light sources at K time-points of a time cycle, with the ordinary display device refreshed by corresponding optical information synchronously, where $2 \leq K < M$.

Preferably, according to the real-time spatial position of the pupil at a time-point, a corresponding ordinary light source is switched on by the control device, with the ordinary display device refreshed by corresponding optical information synchronously.

Preferably, the M ordinary light sources are replaced by the combination of an ordinary light source and a controllable deflection device;

wherein the controllable deflection device can deflect the light from the ordinary light source under control of control device, to provide backlight to the ordinary display device along M directions, or the controllable deflection device can deflect the light from the ordinary display device into the entrance pupil along M directions.

Preferably, the M orthogonal-characteristic light sources and the relay device are replaced by a controllable deflection device, which can deflect the light from the ordinary display device under control of control device;

wherein a microstructure array consisted of microstructures is attached to the ordinary display device, with the microstructures taking a one-to-one correspondence with the pixels or the subpixels of the display device of orthogonal-characteristic for modulating exit angles and exit directions of the exiting beams;

wherein the ordinary display device is an active self-luminous device, or a passive non-self-luminous device with a backlight;

wherein the optical structure of an ordinary display device/the microstructure array/the controllable deflection device functions as a thin-and-light display device projecting directional light beams.

Preferably, the M ordinary light sources and the relay device are replaced by M filter apertures on the spectral plane, which are switched on and off sequentially under control of control device at M time-points of each time cycle and only one filter aperture is switched on at a time-point;

wherein the ordinary display device is an active self-luminous device, or a passive non-self-luminous device with a backlight.

Preferably, the M ordinary light sources and the relay device are replaced by a filter aperture on the spectral plane and a controllable deflection device;

wherein the controllable deflection device can deflect the light from the filter module under control of the control device, to guide the light from the ordinary display device to the entrance pupil along M directions;

wherein the ordinary display device is an active self-luminous device, or a passive non-self-luminous device with a backlight.

The present invention has the following technical effects: with backlight along different directions, two-dimensional images loaded onto the display device of orthogonal-characteristic or the ordinary display device are guided to pupil of the viewer along different directions by the light and thin optical waveguide device. Orthogonal characteristics are designed for better VAC-free display through More-than-one-view-one-pupil technology or/and Maxwellian view technology.

The light and thin optical waveguide device makes the display module suitable for near-eye display.

The details of the embodiments of the present invention are reflected in the drawings or/and the following description. Other characteristics, objects and advantages of the present invention will become more apparent through the following description and the accompanying drawings.

BRIEF DESCRIPTION OF THE DRAWINGS

The drawings are used for better understanding the present invention and are also part of this specification. The drawings and descriptions illustrating the embodiments are used together to explain the principle of the present invention.

DETAILED DESCRIPTION

The present invention provides an optical-waveguide display module with multiple light sources. The light emitted from multiple light sources is used as the directional backlights along different directions to the display device for implementing Maxwellian view display or More-than-one-view-one-pupil display. With two said display modules being taken as two eyepieces, VAC-free display can get implemented by a binocular display system.

Embodiment 1

Figure 1:
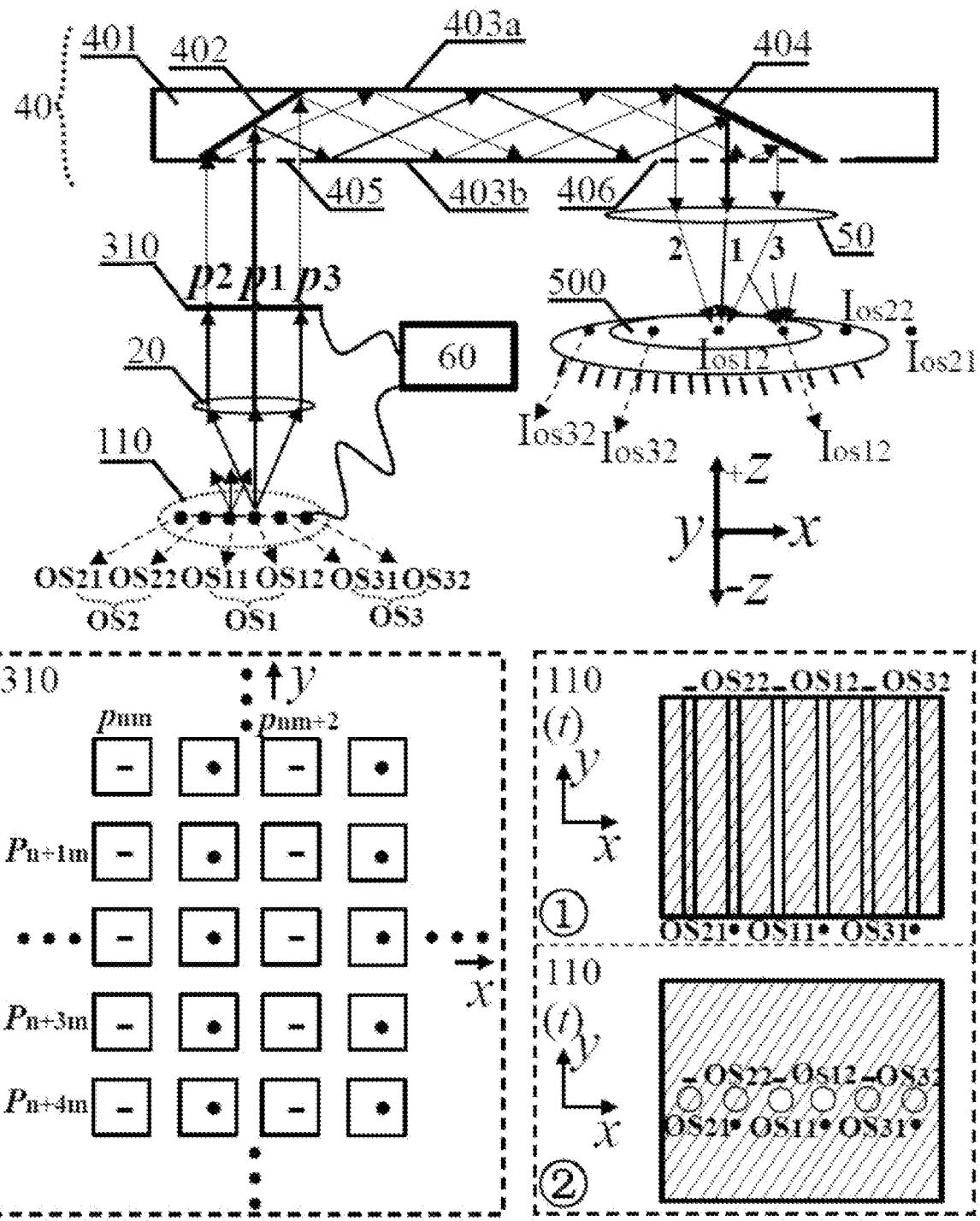
FIG. 1 is a schematic diagram of the display module with a light-source array of timing-orthogonal-characteristic.

FIG. 1 shows the basic structure of an optical-waveguide display module with multiple light sources, including a light-source array of timing-orthogonal-characteristic 110, a relay device 20, a display device of orthogonal-characteristic 310, an optical waveguide device 40, a converging device 50 and a control device 60. The control device 60 connects with the light-source array of timing-orthogonal-characteristic 110 and the display device of orthogonal-characteristic 310. Wherein the light-source array of timing-orthogonal-characteristic 110 includes M≥2 orthogonal-characteristic light sources, and each orthogonal-characteristic light source composes of L≥2 sub-light sources. The L sub-light sources of each orthogonal-characteristic light source correspond to L kinds of orthogonal characteristics by a one-to-one manner. Each sub-light source only emits light of a corresponding orthogonal characteristic. FIG. 1 takes M=3 and L=2 as an example. M=3 orthogonal-characteristic light sources are denoted as $OS_1$, $OS_2$, $OS_3$. Each orthogonal-characteristic light source is consisted of L=2 sub-light sources, such as sub-light sources $OS_{11}$ and $OS_{12}$ of the orthogonal-characteristic light source $OS_1$, sub-light sources $OS_{21}$ and $OS_{22}$ of the orthogonal-characteristic light source $OS_2$, sub-light sources $OS_{31}$ and $OS_{32}$ of the orthogonal-characteristic light source $OS_3$. In FIG. 1, the L=2 orthogonal characteristics take two linear polarizations with polarization directions perpendicular to each other as an example. The two linear polarizations are denoted by "•" and "-" respectively in FIG. 1. Specifically, the sub-light sources $OS_{11}$, $OS_{21}$, and $OS_{31}$ emit "-" light, and the sub-light sources $OS_{12}$, $OS_{22}$, and $OS_{32}$ emit "•" light. M=3 orthogonal-characteristic light sources are switched on and off sequentially by the control device 60 at M=3 time-points of a time cycle. At a time-point, only L=2 sub-light sources of one orthogonal-characteristic light source get switched on, and project light to the relay device 20. Specifically, at time-point t of the time cycle t~t+$\Delta$ t, only the sub-light sources $OS_{11}$ and $OS_{12}$ of the orthogonal-characteristic light source $OS_1$ get switched on, and sub-light sources $OS_{21}$, $OS_{22}$, $OS_{31}$, and $OS_{32}$ are all switched off. At time-point t+$\Delta$ t/3 of the time cycle t~t+$\Delta$ t, only the sub-light sources $OS_{21}$ and $OS_{22}$ of the orthogonal-characteristic light source $OS_2$ get switched on, and sub-light sources $OS_{11}$, $OS_{12}$, $OS_{31}$, and $OS_{32}$ are all switched off. At time-point t+2$\Delta$/3 of the time cycle t~t+$\Delta$ t, only the sub-light sources $OS_{31}$ and $OS_{32}$ of the orthogonal-characteristic light source $OS_3$ get switched on, and sub-light sources $OS_{11}$, $OS_{12}$, $OS_{21}$, and $OS_{22}$ are all switched off. The relay device 20 modulates the light from each sub-light source to reduce divergence. In FIG. 1, specifically a lens is taken as the relay device 20, and the distance between the relay device 20 and the light-source array of timing-orthogonal-characteristic 110 is set to be equal to the focal length of the lens-type relay device 20. The light from a point of a sub-light source is transformed into a parallel light along corresponding propagation direction by the relay device 20, and incidents onto the display device of orthogonal-characteristic 310 as directional backlight. The display device of orthogonal-characteristic 310 is composed of pixels, and each pixel plays the function of displaying optical information by modulating incident light. Along one direction, pixels with an interval of (L-1)=1 pixel come into a pixel-group, and all pixels of the display device of orthogonal-characteristic 310 are divided into L=2 pixel-groups. These L=2 pixel-groups correspond to L=2 sub-light sources of each orthogonal-characteristic light source, respectively. The pixels of each pixel-group only modulate light from the corresponding sub-light sources, blocking light from non-corresponding sub-light sources. As shown in the lower-left graph of FIG. 1, the pixels marked with "-" only modulate "-" light, but block "•" light; the pixels marked with "•" only modulate "•" light, but block "-" light. For example, attaching a corresponding polarizer to each pixel can achieve this effect. The pixel-group consisted of "-" is named as "-" pixel-group, and the pixel-group consisted of "•" pixels is named as "•" pixel-group. Then, at one time-point, the directional backlights projected from L=2 switched-on sub-light sources are modulated by these L=2 pixel-groups, respectively. In other words, the L=2 pixel-groups of the display device of orthogonal-characteristic 310 work as two effective display screens, respectively taking lights from L=2 sub-light sources as directional backlights along different directions. At M=3 time-points of a time cycle, each pixel-group perceives M=3 backlights along M=3 directions. The optical waveguide device 40 shown in FIG. 1 is comprised of a wave-guide body 401, an entrance pupil 405, a couple-in element 402, reflecting surfaces 403a and 403b, a couple-out element 404, and an exit pupil 406. The function of the optical waveguide device 40 is to guide light from the display device of orthogonal-characteristic 310 to the observing zone for the pupil 500. The guiding process is described as follows: light from a sub-light source enters the wave-guide body 401 through the entrance pupil 405; then, guided by the couple-in element 402 and reflected by the reflecting surfaces 403a and 403b, the light propagates in the wave-guide body 401 toward the couple-out element 404; the couple-out element 404 guides the light from each sub-light source to exit the wave-guide body 401 through the exit pupil 406 along the corresponding direction. The converging device 50 is positioned before the couple-out element 404 along the light propagation direction, to converge the light from each sub-light source to the observing zone for the pupil 500 of the viewer. In FIG. 1, the couple-in element 402 and the couple-out element 404 both take reflective surface as examples, the entrance pupil 405 and the exit pupil 406 are drawn as dashed lines.

FIG. 1 shows the state at time-point t of a time cycle t~t+$\Delta$ t, as an example. At this time-point, the sub-light sources $OS_{11}$ and $OS_{12}$ of the orthogonal-characteristic light source $OS_1$ are switched on. The lights emitted by the sub-light sources $OS_{11}$ and $OS_{12}$ converge to the corresponding converging spots $I_{OS11}$ and $I_{OS12}$, respectively, through the relay device 20, the optical waveguide device 40 and the converging device 50. These converging spots can be linear-shaped or point-shaped. For each converging spot, its concrete shape depends on that of the corresponding sub-light source. The light from the sub-light source $OS_{11}$ is modulated by the "-" pixel-group; the light from the sub-light source $OS_{12}$ is modulated by the "•" pixel-group. For clarity purpose, only three pixels $p_1$, $p_2$, and $p_3$ of the "•" pixel-group and corresponding light beams are shown in FIG. 1. Taking pixel $p_1$ as an example, it modulates a beam of light from the sub-light source $OS_{12}$. The modulated light beam from the pixel $p_1$ enters the wave-guide body 401 through the entrance pupil 405, and then propagates along the wave-guide body 401 by the couple-in element 402 and the reflecting surfaces 403a and 403b. The couple-out element 404 guides modulated light beam to exit the wave-guide body 401, and to pass through the exit pupil 406. Finally, through the converging device 50, this modulated light beam reaches to converging spot $I_{OS12}$ along the direction "1". The converging spots corresponding to all sub-light sources construct the observing zone for the pupil 500. Obviously, the modulated light beams from the pixels $p_2$ and $p_3$ are guided to the converging spot $I_{OS12}$ along the direction "2" and "3", respectively. Similarly, at a time-point, for any pixel, the modulated light beam is guided to the converging spot corresponding to the corresponding sub-light source. At a time-point, the optical information loaded by a pixel is the projection information of the displayed scene along the light beam from this pixel and reaching to the observing zone. The optical information loaded by a pixel-group is a two-dimensional image of the displayed scene. Then, at the time-point t of a time cycle t~t+$\Delta$ t, the light emitted by the sub-light source $OS_{12}$ is modulated by the "•" pixel-group, and then converges to the converging spot $I_{OS12}$ with the corresponding two-dimensional image of the displayed scene. The light emitted by the sub-light source $OS_{11}$ is modulated by the "-" pixel-group, and then converges to the converging spot $I_{OS11}$ with the corresponding two-dimensional image of the displayed scene.

Similarly, at time-point $t+\Delta t/3$, the display device of orthogonal-characteristic 310 projects the corresponding two-dimensional images to converging spot $I_{OS21}$ and converging spot $I_{OS22}$, respectively. At time point $t+2\Delta t/3$, the display device of orthogonal-characteristic 310 projects the corresponding two-dimensional images to converging spot $I_{OS31}$ and converging spot $I_{OS32}$, respectively. Then, in a time cycle $t\sim t+\Delta t$, the display device of orthogonal-characteristic 310 projects $M\times L=3\times 2=6$ different two-dimensional images to the $M\times L=3\times 2=6$ converging spots, respectively.

In other time cycles, the above process is performed in the same way, $M\times L=3\times 2=6$ different two-dimensional images are projected to the $M\times L=3\times 2=6$ converging spots in the observing zone sequentially.

The sub-light sources are categorized into two types. The first type of sub-light source takes a linear shape. This kind of sub-light sources are called linear-shaped sub-light sources. Here, the linear shape means a shape with unequal length and width, not means a "straight line" in a strict sense. The $M\times L=6$ linear-shaped sub-light sources are arranged along a one-dimensional direction, as shown in the dashed frame ① in FIG. 1. Here, $M\times L=6$ sub-light sources are arranged along the x direction, and all sub-light sources are with the long direction along the y direction. In FIG. 1, the pupil 500 of the viewer is located on the plane containing all the converging spots. Two reasons make the linear-shaped converging spot having a real size along the arrangement direction (x-direction). The first one is due to the width of the corresponding sub-light source, and the second is related with the diffraction introduced by the pixel structure. For each linear-shaped converging spot, the area where the light intensity is not less than 50% of the maximum value is set as the viewing zone of the two-dimensional image projected by corresponding sub-light source and pixel-group. Along the x-direction, the size of each viewing zone is designed to be less than $D_p$. Here, $D_p$ is the diameter of the pupil 500. Under this premise, when at least two viewing zones intersect with the pupil 500 in the observing zone, that is to say when the x-direction distance between adjacent viewing zones is less than $D_p$, at least two two-dimensional images projected by pixel-groups corresponding to these at least two viewing zones will be perceived by the pupil 500 in each time cycle. For a displayed spatial point, based on the persistence of vision, at least two passing-through light beams from the at least two two-dimensional images overlap into a spatial light spot that the eye can focus on naturally, with the VAC being kicked off successfully by the More-than-one-view-one-pupil technology. In a display system, the pupil 500 always needs an eye-box, which provides a space for the reasonable moving of the pupil 500. At any position of the eye-box, the pupil needs to intersect with at least two viewing zones. Compared with point-shaped viewing zones, the linear-shaped viewing zones resulting from linear-shaped sub-light sources have an advantage that only one-directional arrangement of viewing zones is necessary, which alleviates the excessive requirements on the number of viewing zones when an eye-box for the pupil 500 is constructed. Constructing such an eye-box, the point-shaped viewing zones need to be arranged along two dimensions.

In FIG. 1, the viewing zones corresponding to converging spots $I_{OS11}$, $I_{OS12}$, and $I_{OS31}$ contact with the pupil 500, and the VAC-free display get implemented based on the More-than-one-view-one-pupil technology. The pupil 500 may also deviate from the surface containing the converging spots. In this case, the pupil 500 may not be able to receive all light beams from two whole pixel-groups. Actually, different parts of two-dimensional images projected by different pixel-groups can splice into a two-dimensional splicing image. When at least two two-dimensional splicing images, or at least one two-dimensional image and one two-dimensional splicing image are perceived by a pupil in each time cycle, More-than-one-view-one-pupil display can also get implemented.

Figure 2:
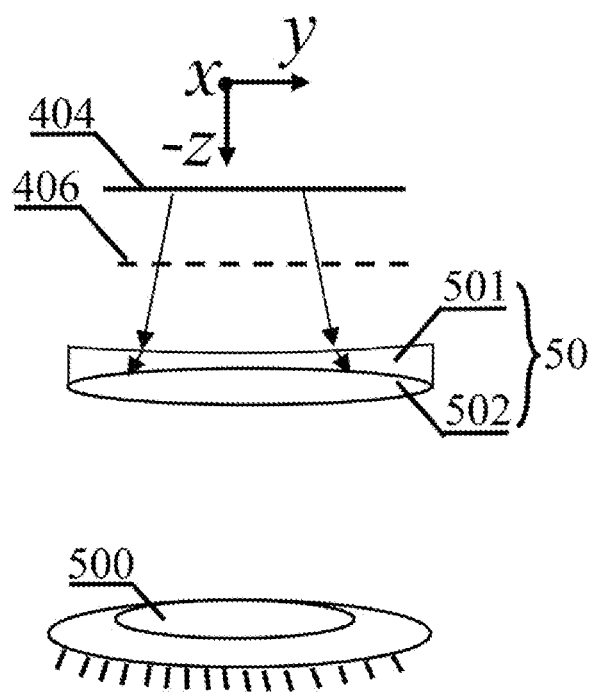
FIG. 2 shows another example of the converging device in the display module with linear-shaped sub-light sources.

In the case of a linear-shaped sub-light source, the modulated beam which exits each pixel is a divergent beam, with a convergence angle along the long direction larger than that along the width direction. The waist location of the modulated beam perceived by the pupil 500 in the plane containing the long direction (y-direction in FIG. 1) can be modulated along the depth direction (z-direction) to a position around the displayed scene. The converging device 50 can play this function, for example, the converging device 50 in FIG. 2 which is made up with a y-direction concave cylindrical lens 501 and a convex lens 502. The y-direction concave cylindrical lens only modulates the incident light along the y direction.

Another type of a sub-light source is with a point shape. This kind of sub-light sources are called point-shaped sub-light sources. The physical point-shaped sub-light source is of a size with approximately equal length and width. The $M\times L=6$ point-shaped sub-light sources are arranged along x-direction, as shown in the dashed frame ② in FIG. 1, where a circle "○" is used to represent a point-shaped sub-light source. These $M\times L=6$ point-shaped sub-light sources $OS_{11}$, $OS_{12}$, $OS_{21}$, $OS_{22}$, $OS_{31}$, $OS_{32}$ correspond to converging spots $I_{OS11}$, $I_{OS12}$, $I_{OS21}$, $I_{OS22}$, $I_{OS31}$, $I_{OS32}$, respectively. The point-shaped converging spot also occupies a non-zero area. For each point-shaped converging spot, the area where the light intensity is not less than 50% of the maximum value is set as the viewing zone of the two-dimensional image corresponding to the corresponding sub-light source. Along the arrangement direction of the converging spots, the size of each viewing zone is designed less than $D_p$. Under this premise, when at least two viewing zones intersect with the pupil 500 in the observing zone, that is to say when the x-direction distance between adjacent two viewing zones is less than $D_p$, at least two-dimensional images projected by pixel-groups corresponding to these at least two viewing zones will be perceived by the pupil 500 in each time cycle. For each displayed spatial point, at least two passing-through light beams from these at least two two-dimensional images overlap into a spatial light spot that the eye can focus on naturally, thus the VAC being kicked off successfully based on the More-than-one-view-one-pupil technology. In a display system, the pupil 500 always needs an eye-box, which provides a space for reasonable movements of the pupil 500. At any position of the eye-box, the pupil needs to intersect with at least two viewing zones. Constructing such an eye-box, the point-shaped viewing zones need to be arranged along two dimensions. Here, only one-dimensional point-shaped viewing zones are shown as example for simplicity.

In FIG. 1, convergence points $I_{OS11}$, $I_{OS12}$, and $I_{OS31}$ fall into the pupil 500, and More-than-one-view-one-pupil display can get implemented.

In FIG. 1, the pupil 500 is set on the surface containing the converging spots. The pupil 500 may also deviate from this surface. Under this condition, when at least two two-dimensional splicing images, or at least one two-dimensional image and one two-dimensional splicing image are perceived by a pupil in each time cycle, More-than-one-view-one-pupil display can also get implemented.

When point-shaped viewing zones are presented, Maxwellian view display can get implemented for VAC-free display, if only one two-dimensional image, or only one two-dimensional splicing image is perceived by the pupil 500 in each time cycle. When more than one two-dimensional image or one two-dimensional splicing image are perceived by the pupil 500, but the perceived optical information is not enough to contain two two-dimensional images (or two two-dimensional splicing images, or one two-dimensional image and one two-dimensional splicing images), the two mechanisms of More-than-one-view-one-pupil and Maxwellian view work together.

With point-shaped sub-light sources, the arrangement of the orthogonal-characteristic light sources can also be along two-dimensional directions. In this embodiment, said one-dimension direction can be a direction along a straight line or along a curved line.

Figure 3:
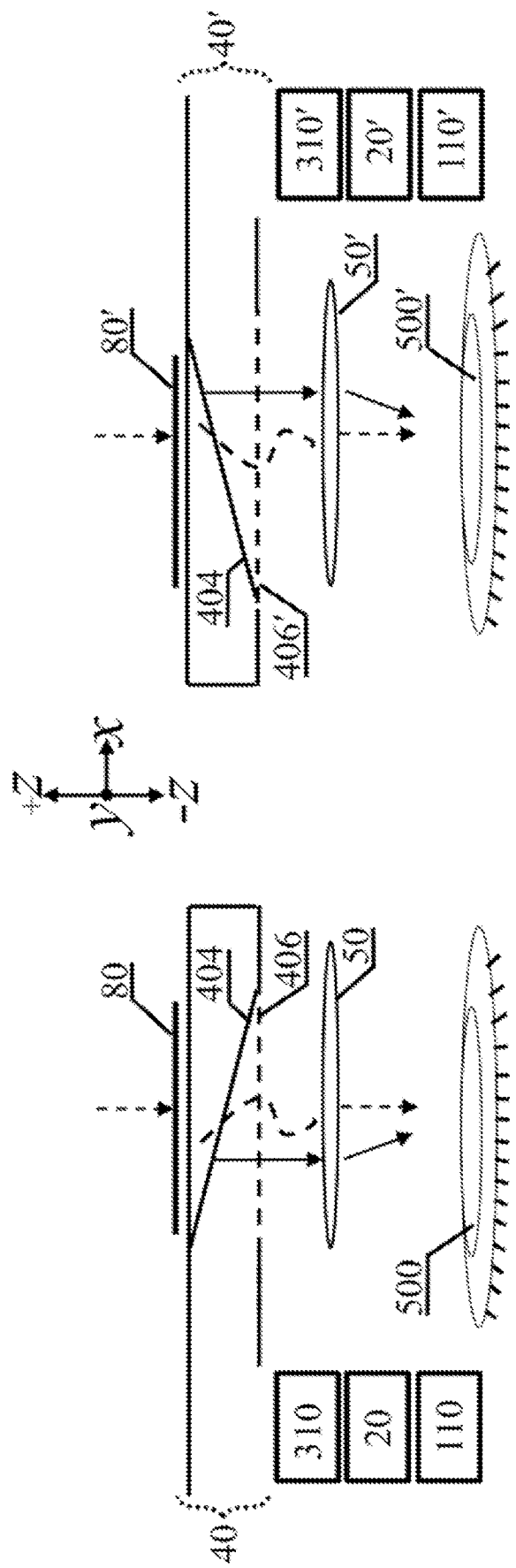
FIG. 3 shows a binocular display system taking display modules with two display modules with light-source arrays of timing-orthogonal-characteristic being taken as two eyepieces.

The optical-waveguide display module with multiple light sources in this embodiment can be used as an eyepiece. Two such eyepieces construct a binocular display system as shown in FIG. 3. In FIG. 3, the two display modules for two pupils 500 and 500' are shown, with some parts replaced by line frame boxes, and some parts are omitted. Such simplification is easy to be understood by professional staff in three-dimensional display field, and will also appear in the following segments without explanation any longer.

Figure 4:
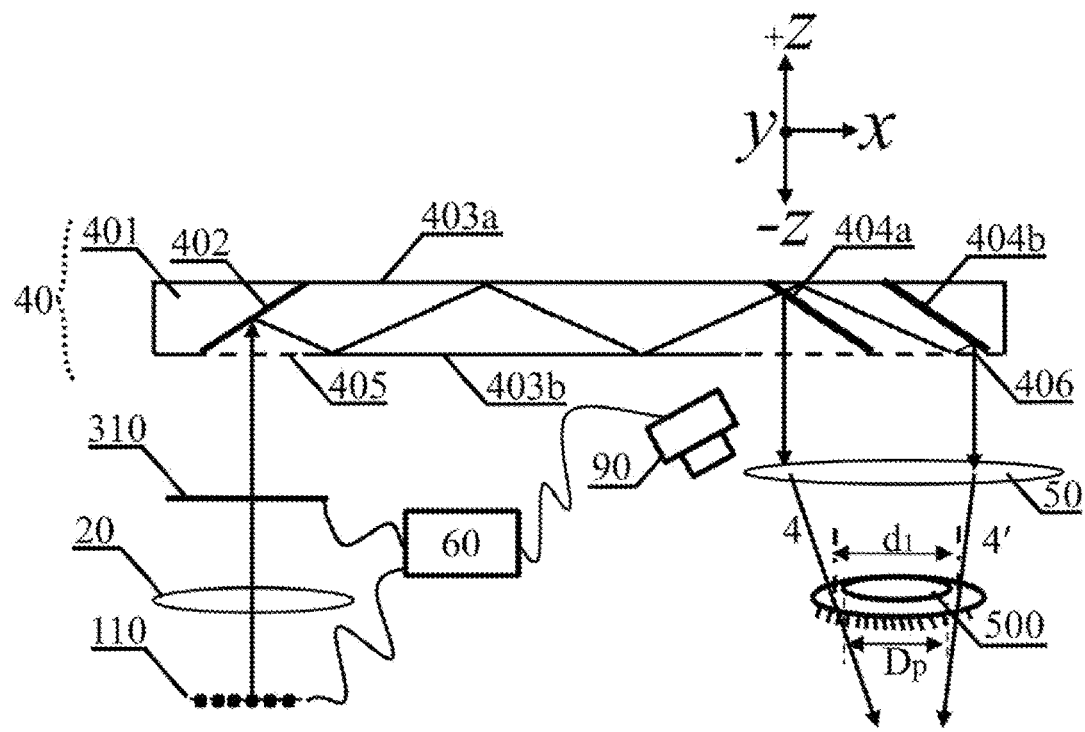
FIG. 4 shows a couple-out element consisted of two components in a display module with a light-source array of timing-orthogonal-characteristic.
Figure 5:
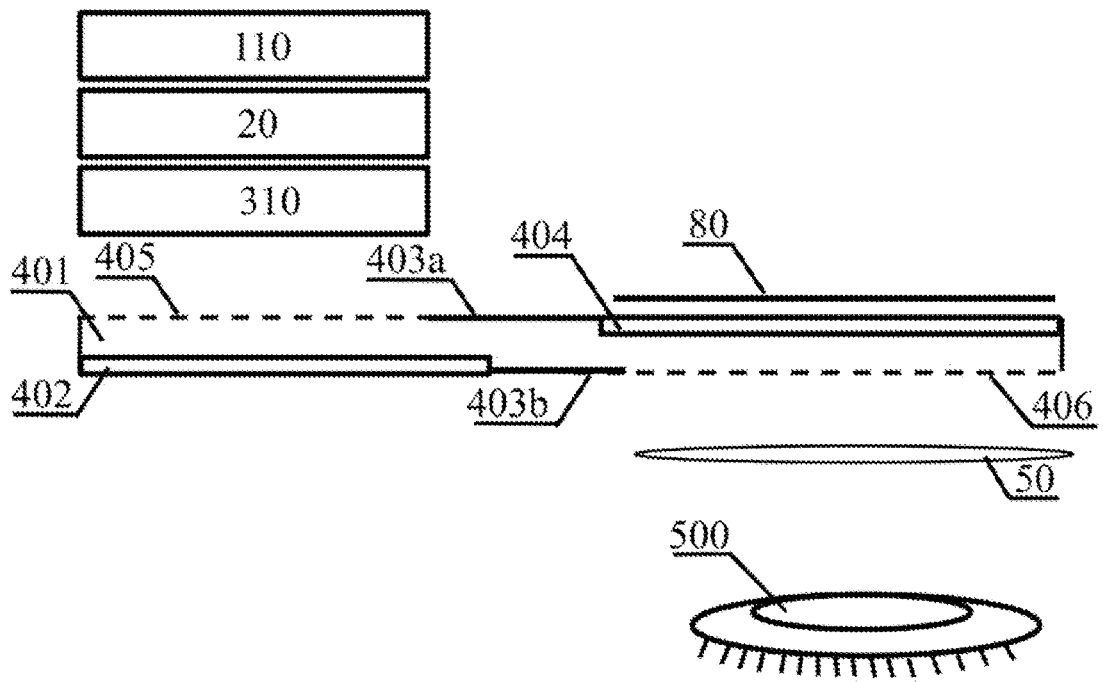
FIG. 5 shows an optical waveguide device with another type of couple-in element and couple-out element in a display module with a light-source array of timing-orthogonal-characteristic.

The optical waveguide device 40 shown in FIG. 1 can adopt a multi-component couple-out element 404, which is composed of more than one component elements for exit-pupil-expansion. Under this condition, at a time-point, a light beam from a pixel will incident onto the couple-out element 404 more than once, being guided to the exit pupil by different component elements of the multi-component couple-out element 404 as light beams propagating along different light paths. In the patent application, light beams with different light paths are taken as different light beams with different directions. That is to say, due to the existence of the multi-component couple-out element 404, the different light beams from a same pixel propagate to the observing zone with same optical information at a time-point. In this patent application, such different light beams from a same pixel should be prevented from entering into the pupil 500 simultaneously. So, this patent application takes "a pixel or a subpixel of the display device of orthogonal-characteristic 310 projects at most one beam of light into the pupil 500 of the viewer at a time-point" of Claim 1 as a prerequisite. When exit-pupil-expansion gets implemented in the optical waveguide device 40, the different light beams from a same pixel at a same time-point should have a distance large enough for not entering into the pupil 500 simultaneously. For example, the multi-component couple-out element 404 is consisted of a semitransparent surface 404a and a reflective surface 404b in FIG. 4. Guided by these two component elements, two light beams along the directions "4" and "4"', which are from a same pixel at a same time-point, have an interval of $d_1 > D_p$ on the plane containing the pupil 500. Under this condition, a tracking device 90, which is connected to the control device 60 and used for real-timely tracking and determining a spatial position of the pupil 500, should be introduced into the display module, to determine which light beam from each pixel enters into the pupil 500 at a time-point. Then at a time-point, for each pixel, the control device 60 refreshes this pixel with the projection information of the displayed scene along its light beam that enters into the pupil 500. A compensation unit 80 can also be designed to eliminate the impact of the converging device 50 on the incident light from the external environment, as shown in FIG. 5.

In above figures, the couple-in element 402 and the couple-out element 404 take semitransparent surface and reflective surface as example. Actually, other existing or yet-to-be-developed kinds of optical waveguides can be taken as the optical waveguide device 40 of this patent application. For example, the optical waveguide shown in FIG. 5, which takes grating elements or holographic elements as the couple-in element 402 and the couple-out element 404. With exit-pupil-expansion being designed, the multi-component couple-out element 404 is also needed. Concretely, the component elements of a multi-component couple-out element 404 can be arranged separated, adjacent, or partial overlapped.

Figure 6:
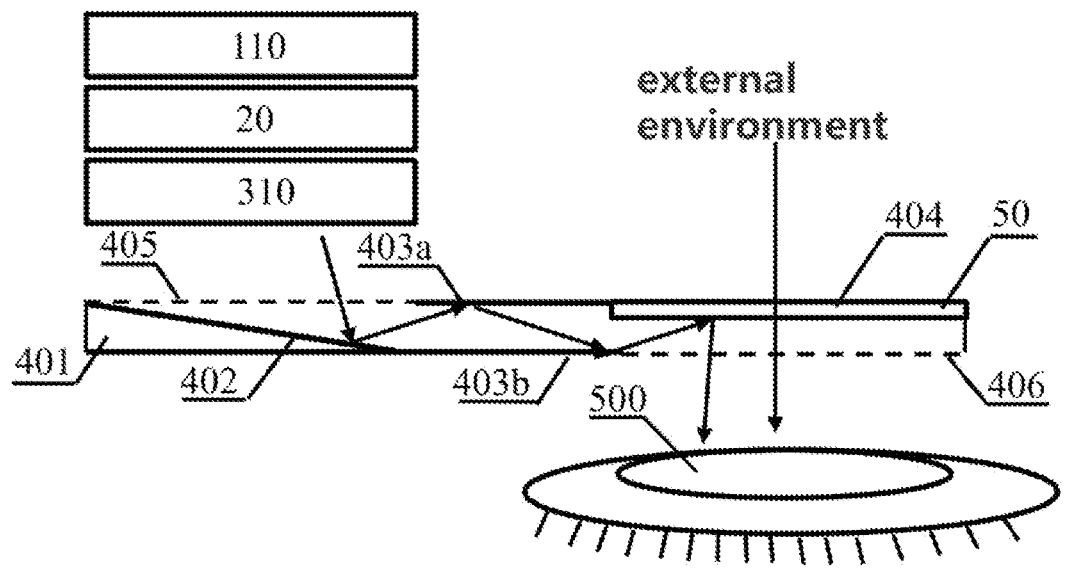
FIG. 6 is a structural diagram of a display module taking a light-source array of timing-orthogonal-characteristic with the converging device being integrated into the couple-out element.

The function of the converging device 50 can also be integrated into the optical waveguide device 40. For example, a holographic-element can play both functions of out-coupling device 404 and converging device 50 as shown in FIG. 6, with the converging device 50 playing the function equivalent to that of reflective concave lens. When the holographic-element has no effect on the light from external environment with an incident angle near to 90 degree, the compensation unit 80 is not necessary any more. Actually, the optical-waveguide display module with multiple light sources can be used as an eyepiece of an AR display system.

Figure 7:
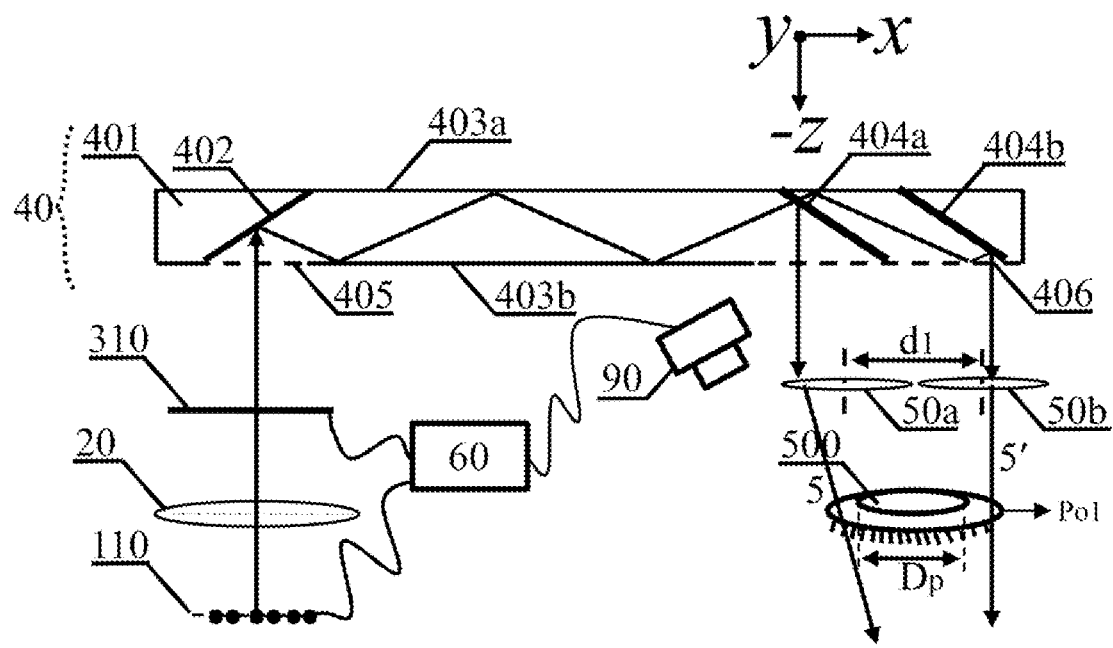
FIG. 7 is a structural diagram of a display module taking a light-source array of timing-orthogonal-characteristic with the converging device being consisted of two components.
Figure 8:
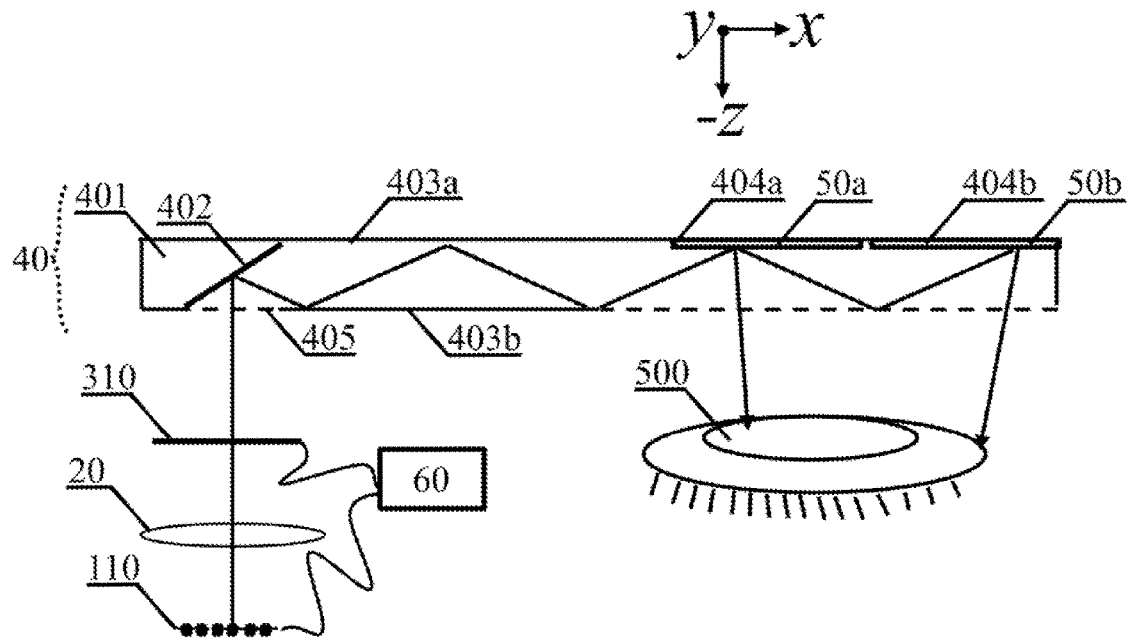
FIG. 8 is a structural diagram of a display module taking a light-source array of timing-orthogonal-characteristic with the multi-component converging device being integrated into the couple-out element.

It is worth noting that when considering exit-pupil-expansion, at a same time-point, different light beams from a pixel, guided out by different component elements of the multi-component couple-out element 404, may inevitably enter the pupil 500 simultaneously. For example, in FIG. 4, the light beams along the directions "4" and "4"' will converge into a common point on the focal plane of the converging device 50. If the pupil 500 is exactly at the focal plane, these two light beams may enter into the pupil 500 simultaneously unavoidably. To solve this problem, a multi-component converging device 50 can help. The multi-component converging device 50 is composed of multiple component elements, for example two lenses 50a and 50b as shown in FIG. 7. Preferably, the two lenses correspond to the two component elements of the multi-component couple-out element 404, respectively. Thus, light beams from a same pixel at a same time-point can get separated by the multi-component converging device 50 for avoiding entering into the pupil 500 simultaneously, such as the example shown in FIG. 7. Similarly, the multi-component converging device 50 can also be integrated into the multi-component couple-out element 404, such as the example shown in FIG. 8.

In the example shown in FIG. 1, the light emitted by a point of a sub-light source is converted into a parallel backlight by the relay device 20 for entering into the display device of orthogonal-characteristic 310. The backlight from a point of a sub-light source may be in a non-parallel state. For example, the light from a point of a sub-light source enters the optical waveguide device 40 as a convergent beam. The convergent beams make a converging spot closer to the converging device 50.

As described above, the optical-waveguide display module with multiple light sources in this embodiment can project M×L two-dimensional images of the displayed scene in each time cycle. A larger value of M requires a display device of orthogonal-characteristic 310 with a higher frame rate, to guarantee a necessary display frequency (display frequency=frame rate of the display device of orthogonal-characteristic 310/M) for flicker-free display. A larger L needs more orthogonal characteristics. Besides two linear polarizations with polarization directions perpendicular to each other, left-handed light and right-handed light are another two orthogonal characteristics. Furthermore, colors are another kind of orthogonal characteristic, such as R (red), G (green), and B (blue) colors. Actually, R, G, B colors are commonly-used primary colors in a display screen, where three subpixels of each pixel exit these three primary colors. Taking R color, G color, and B color as L=3 orthogonal characteristics, all the subpixels exiting R color come into a group, all the subpixels exiting G color come into a group, and all the subpixels exiting B color come into a group. These groups are three subpixel-groups. So, the process discussed above for pixels can also apply to the subpixels. Going one step further, subpixels of a same color can be categorized into different groups with different other orthogonal characteristics. For example, all subpixels of a same color are grouped into two groups, which exit light of two linear polarizations with polarization directions perpendicular to each other, respectively. Thus, there are L=6 orthogonal characteristics, denoted as R+"-", R+"•", G+"-", G+"•", B+"-", B+"•". Correspondingly, L=6 subpixel-groups get implemented. Even so, the available orthogonal characteristics are also very limited.

Figure 9:
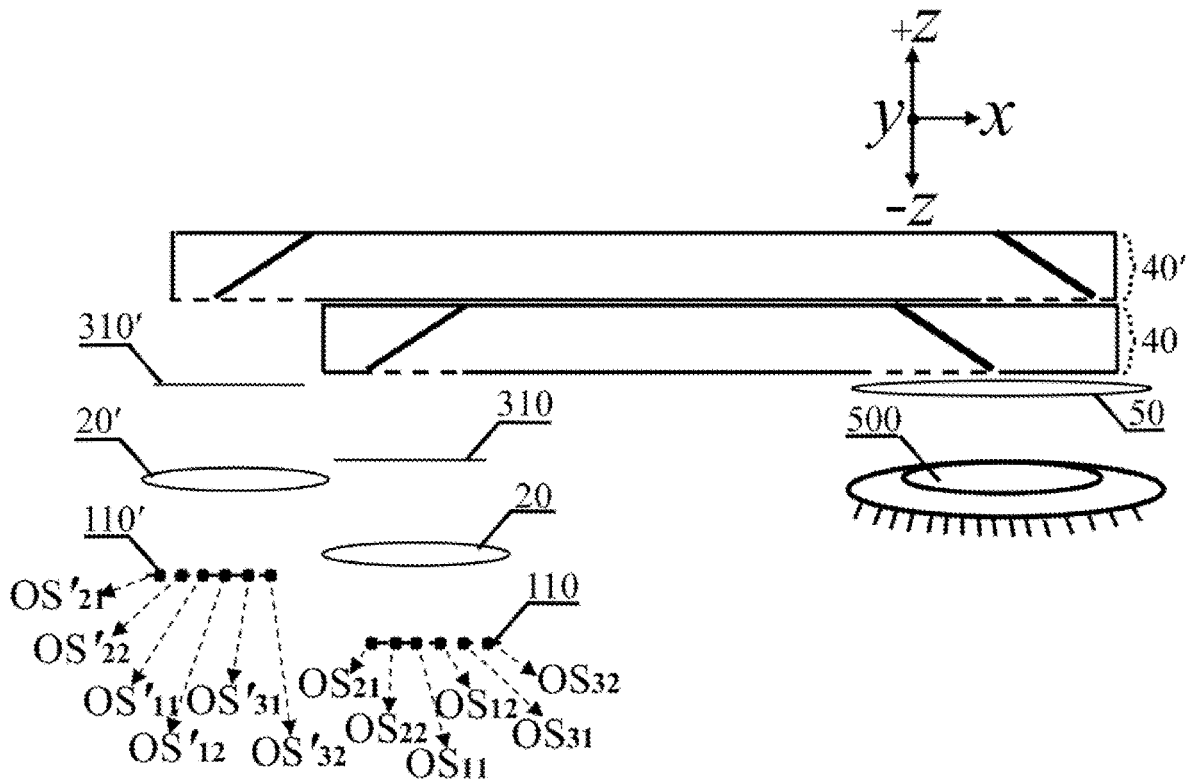
FIG. 9 is a schematic diagram of a compound display module stacked by two element display modules with a light-source arrays of timing-orthogonal-characteristics.

N (N≥2) optical-waveguide display modules with multiple light sources can stack together as a compound display module, for presenting N×M×L two-dimensional images in a time cycle. In the case, a said optical-waveguide display module with multiple light sources is taken as an element display module. Taking N=2, FIG. 9 shows an example of a compound display module. The light-source arrays of timing-orthogonal-characteristics 110 and 110' are with M=3 orthogonal-characteristic light sources, respectively. Each orthogonal-characteristic light source includes L=2 sub-light sources. At each time-point, N=2 orthogonal-characteristic light sources, which belong to the N=2 element display modules respectively, are switched on. N×M=6 orthogonal-characteristic light sources are switched on and off sequentially at M=3 time-points in each time cycle. Thus, at a time-point, N×L=4 sub-light sources from N=2 element display modules are switched on synchronously, with N×L=4 pixel-groups refreshed by corresponding optical information, respectively. Similarly, VAC-free display gets implemented, with more viewing zones generated. In the compound display module, different element display modules may share a common control device 60, a common converging device 50, or a common compensation unit 80 as needed. An element display module may also adopt multi-component couple-out element 404 or/and multi-component converging device 50.

Among the M orthogonal-characteristic light sources, the viewing zones corresponding to sub-light sources of K(2≤K<M) orthogonal-characteristic light sources are enough for Maxwellian view or More-than-one-view-one-pupil display to the pupil 500. In this case, according to the position of the pupil 500 detected by the tracking device 90, the control device 60 determines the corresponding K orthogonal-characteristic light sources, and then carries out the display by a time cycle of K time-points. There is another case that only one orthogonal-characteristic light source switched on at a time-point is enough for Maxwellian view or More-than-one-view-one-pupil display for the pupil 500. In this case, at each time-point, according to the position of the pupil 500 detected by the tracking device 90, the control device 60 determines the corresponding orthogonal-characteristic light source, and then carries out the display at this time-point. The process discussed above is also applicable to the compound display module, by selecting needed orthogonal-characteristic light source(s) from the N×M orthogonal-characteristic light sources.

In the compound display module shown in FIG. 9, the viewing zones belong to different element display modules may overlap mutually, with the two-dimensional images from different element display modules being spliced together for a larger field of view.

Figure 10:
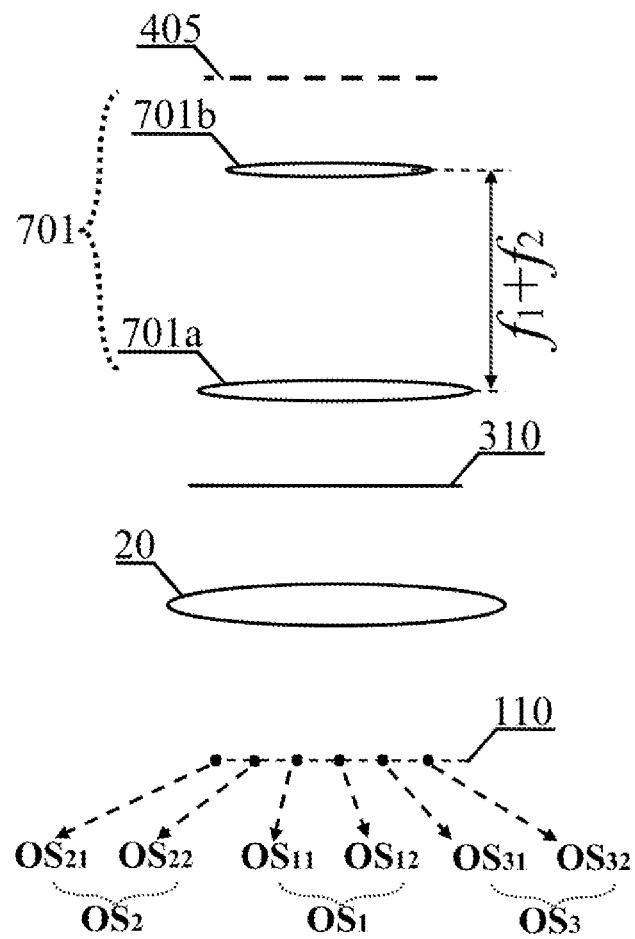
FIG. 10 shows a schematic diagram of a zooming in/out element, which functions as an auxiliary relay device of the display module with light-source arrays of timing-orthogonal-characteristics.
Figure 11:
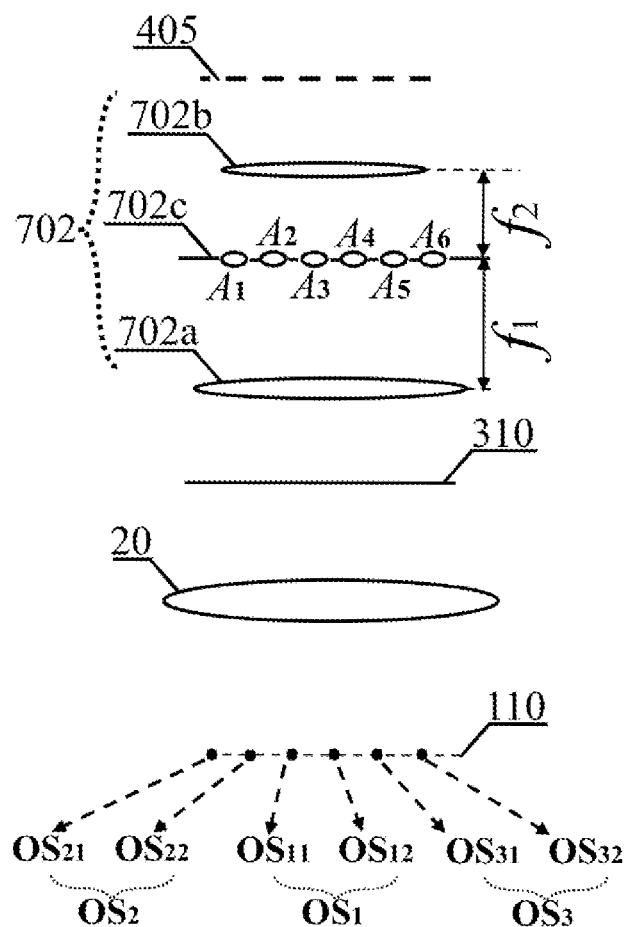
FIG. 11 shows a schematic diagram of a filter module, which functions as an auxiliary relay device of the display module with light-source arrays of timing-orthogonal-characteristics.
Figure 12:
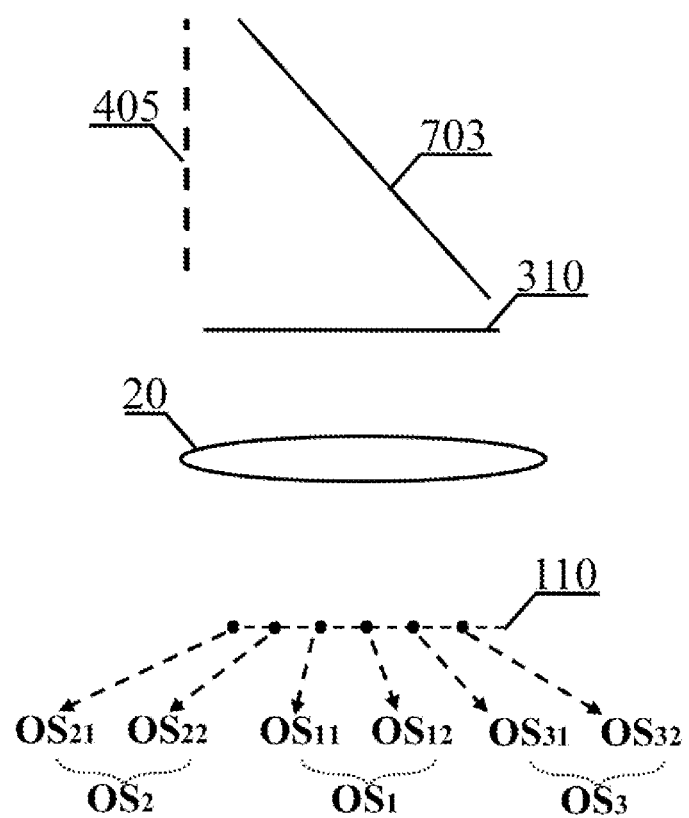
FIG. 12 shows a schematic diagram of a guiding device as an example, which functions as an auxiliary relay device.

An auxiliary relay device 70 may also be placed between the display device of orthogonal-characteristic 310 and the optical waveguide device 40, so as to better guide the display device of orthogonal-characteristic 310 to project light into the optical waveguide device 40. The auxiliary relay device 70 can be a zooming in/out element 701. For example, a lens 701a and a lens 701b shown in FIG. 10 construct a zooming in/out element 701. It adjusts the size of the light distribution zone projected by the display device of orthogonal-characteristic 310 at the entrance pupil 405. The distance between the lens 701a and the lens 701b is optimally equal to the sum of their focal lengths f1 and f2. The auxiliary relay device 70 can also be a filter component 702, which projects the spectral plane of the display device of orthogonal-characteristic 320 and perform filtering on the spectral plane. FIG. 11 shows an example of a filter component 702, which is composed of a lens 702a and a lens 702b. The lens 702a projects the spectral plane of the display device of orthogonal-characteristic 310 on the common focal plane of the lens 702a and the lens 702b. A filter aperture array 702c is placed on the spectral plane. Apertures of the filter aperture array 702c correspond to the sub-light sources by a one-to-one manner, to block high-order diffraction light from the display device of orthogonal-characteristic 310. For a point-shaped sub-light source, the corresponding aperture of the filter aperture array 702c is set as a small hole; for a linear-shaped sub-light source, the corresponding aperture of the filter aperture array 702c is set as a slit. The distance between lens 702a and lens 702b also may be not equal to the sum of their focal lengths f1 and f2. As long as the filter aperture array 702c is placed on the focal plane of lens 702a, filtering can be performed. The auxiliary relay device 70 can also furtherly be a guiding device 703, which reflects and deflects the projected light from the orthogonal characteristic display device 310 to the entrance pupil 405, such as the mirror shown in FIG. 12.

Figure 13:
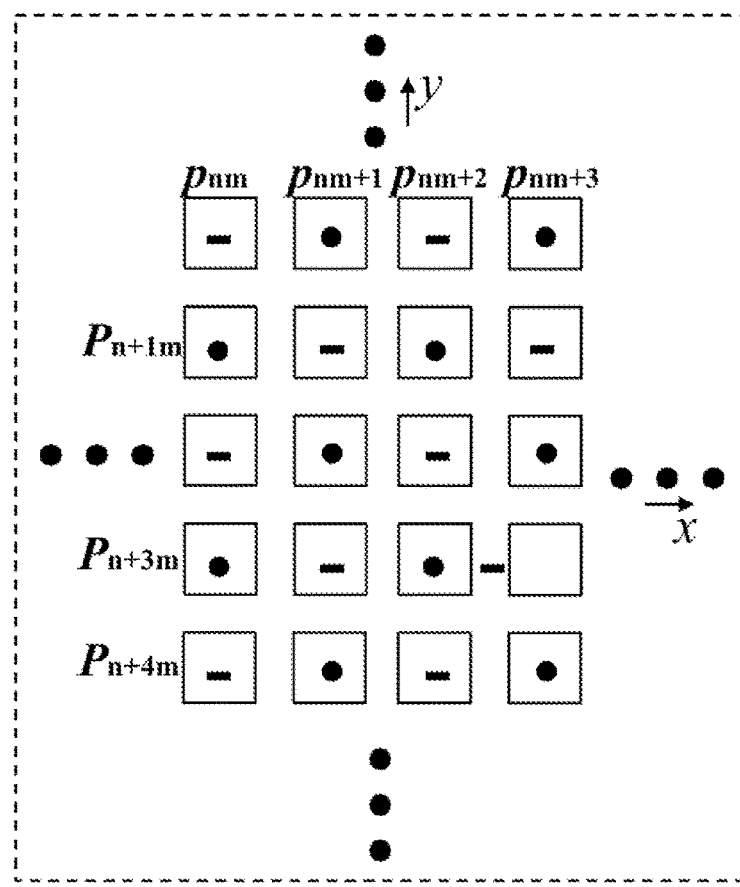
FIG. 13 shows another pixel arrangement example of a display device of orthogonal-characteristic.

In above mentioned related figures, a pixel-group also can be constructed by pixels separated by N−1 pixels along two directions, as shown in FIG. 13. Sub-light sources of different orthogonal-characteristic light sources can also be arranged interlaced. In addition, the display device of orthogonal-characteristic 310 can also be a reflection-type display device. In this case, the positions of the light-source array of timing-orthogonal-characteristic 110 and the relay device 20 need to be adjusted accordingly.

Figure 14:
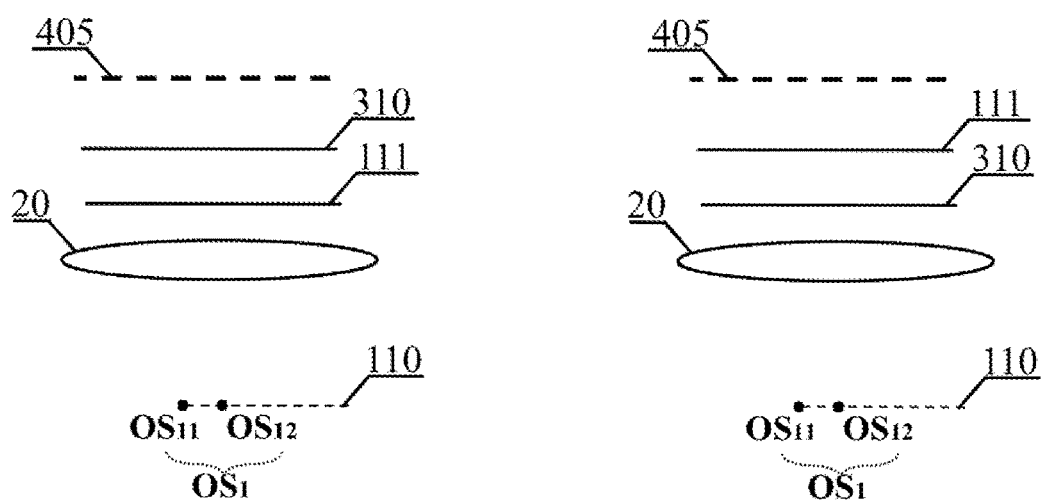
FIG. 14 shows an optical structure which can play the function of M orthogonal-characteristic light sources.
Figure 15:
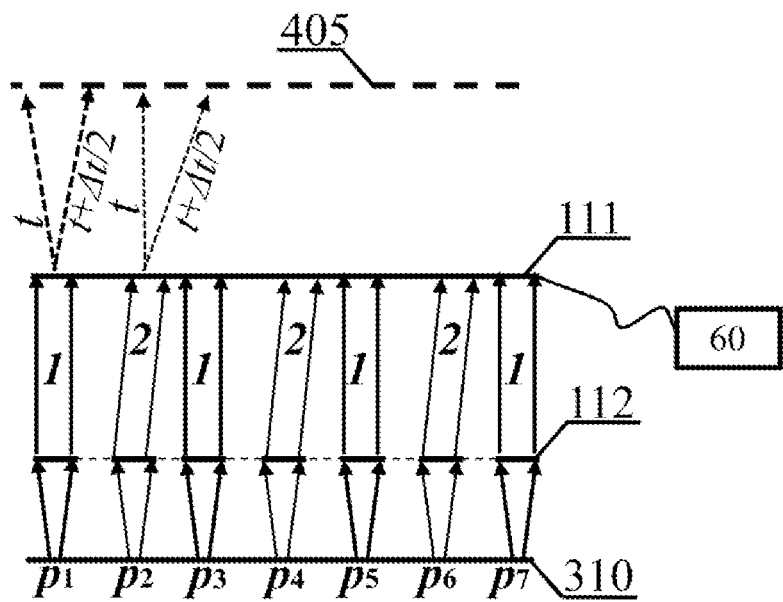
FIG. 15 shows a second kind of optical structure which can play the function of M orthogonal-characteristic light sources.
Figure 16:
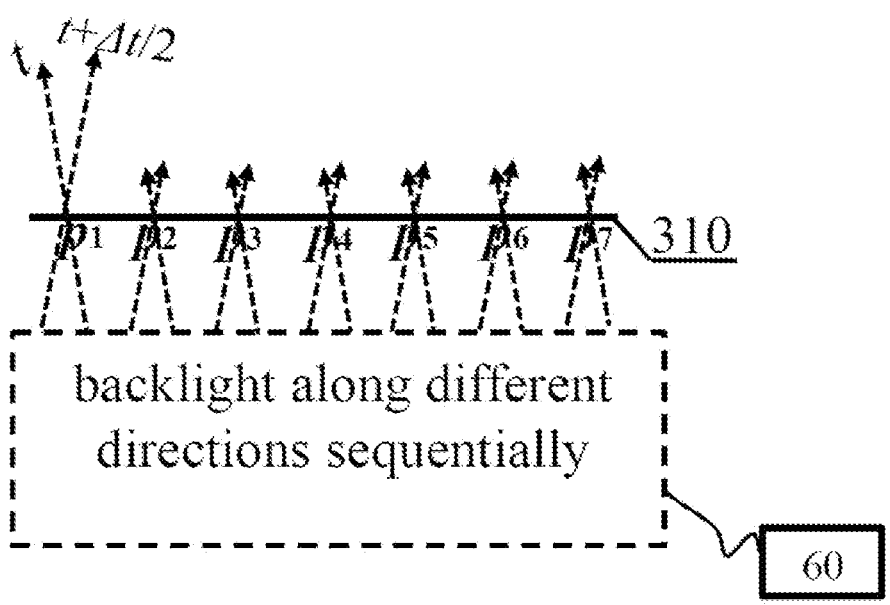
FIG. 16 shows a conventional optical structure of a display device projecting directional light beams.
Figure 17:
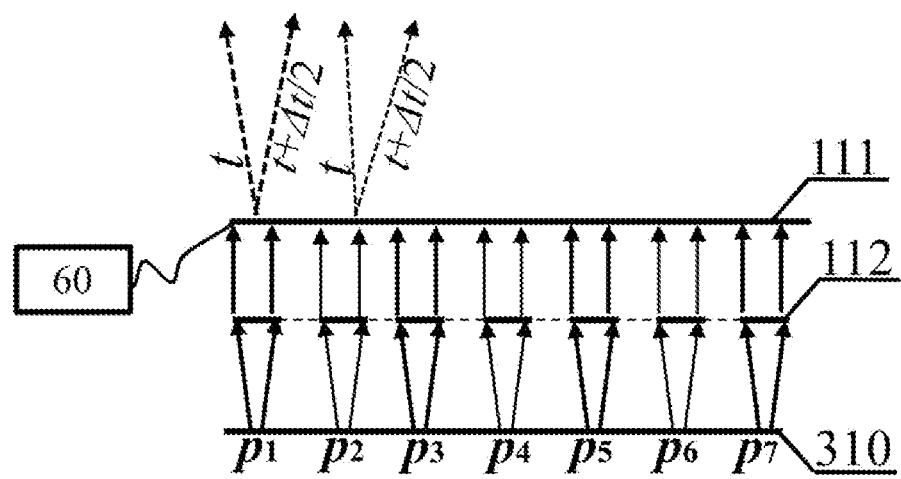
FIG. 17 shows the optical structure of a light-and-thin display device projecting directional light beams.
Figure 18:
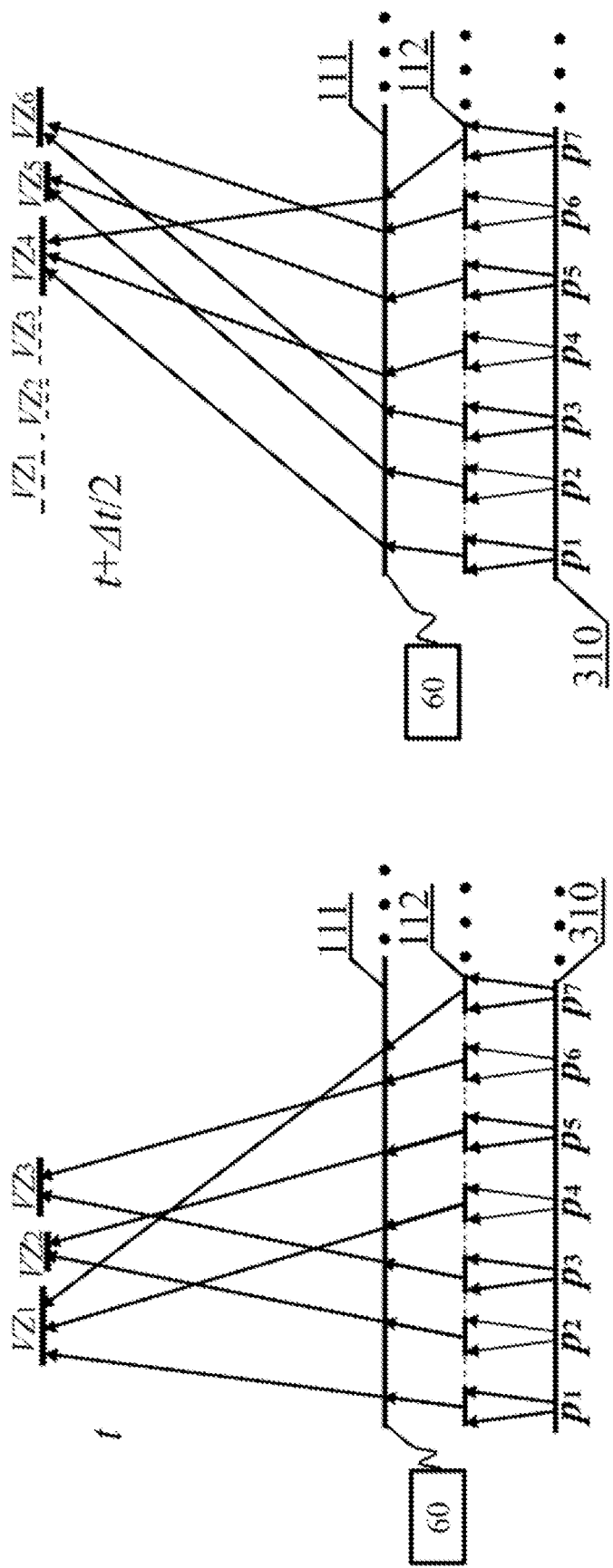
FIG. 18 shows the viewing zones of different sizes and intervals presented by the optical structure shown in FIG. 17.
Figure 19:
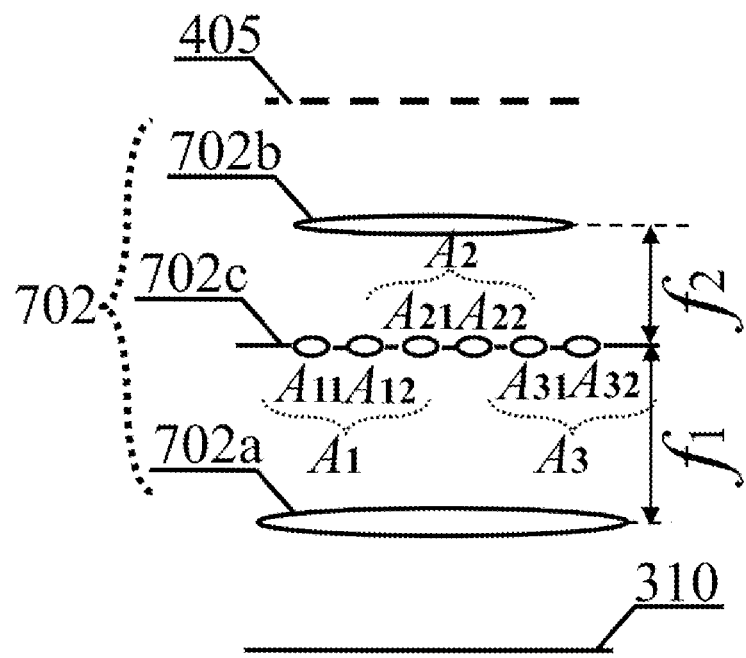
FIG. 19 shows a third kind of optical structure which can play the function of M orthogonal-characteristic light sources.
Figure 20:
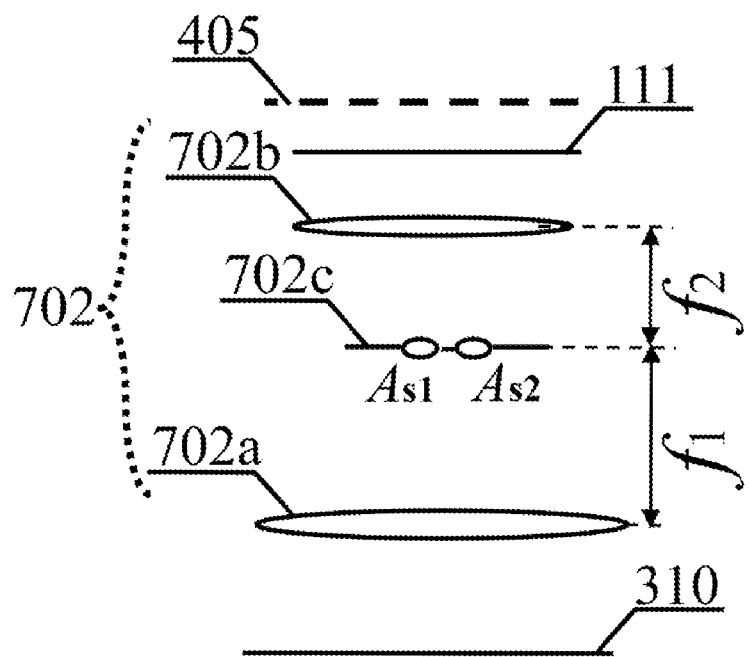
FIG. 20 shows a fourth kind of optical structure which can play the function of M orthogonal-characteristic light sources.

The function of the M orthogonal-characteristic light sources discussed above can be carried out by some other optical devices. Example I, an ensemble of an orthogonal-characteristic light source and a controllable deflection device 111 is adopted, as shown in FIG. 14. The controllable deflection device 111 deflects the light from the orthogonal-characteristic light source under the control of control device 60, to provide backlights to the display device of orthogonal-characteristic 310 along M directions. Or, the controllable deflection device 111 deflects the light from the display device of orthogonal-characteristic 310, to incident into the entrance pupil 401 along M directions. Example II, the M orthogonal-characteristic light sources and relay device 20 are replaced by a controllable deflection device 111, which can deflect the light from the display device of orthogonal-characteristic 310 under the control of control device 60. In the case, a microstructure array 112 consisted of microstructures is attached to the display device of orthogonal-characteristic 310, with the microstructures having a one-to-one relationship with the pixels. A microstructure modulates the light from the corresponding pixel, to get the desired exit direction and exit angle. Then, the controllable deflection device 111 deflects the light beams from the microstructure array 112 by M deflection angles at M time-points of the time cycle. FIG. 15 shows an example, where pixels $p_1$, $p_3$, $p_5$, $p_7$ . . . come into a pixel-group, pixels $p_2$, $p_4$, $p_6$ . . . come into another pixel-group, totally K=2 pixel-groups are taken as example. Different exit directions of lights from different pixel groups get implemented by the microstructure array 112. For example, light beams from pixel-group of $p_1$, $p_3$, $p_5$, $p_7$ . . . exit corresponding microstructures along direction 1, light beams from pixel-group of $p_2$, $p_4$, $p_6$, . . . exit corresponding microstructures along direction 2. At M=2 time-points of a time cycle t~t+$\Delta$ t, the exit directions of light beams from microstructure array 112 are modulated by the controllable deflection device 111 under the control of control device 60. In this case, the display device of orthogonal-characteristic 310 can be an active self-luminous device, or a passive non-self-luminous device with a backlight, and the requirement of different orthogonal characteristics between different pixel-groups is no longer mandatory. The controllable deflection device 111 can be a liquid-crystal deflection device, or an acousto-optic device, or other device with the deflection function. The microstructure can be a holographic grating, or a micro/nano grating, or a meta-surface structure, or other structures. In the display field, display screens which project directional light beams are often used, such as the structure shown in FIG. 16. In such conventional structure, a thick or complicated optical device is often needed to provide backlight along different directions sequentially, such as the "wave-guide backlight unit" of the US patent application (US20210223462A1, THREE-DIMENSIONAL DISPLAY MODULE USING OPTICAL WAVE-GUIDE FOR PROVIDING DIRECTIONAL BACKLIGHTS), or the "backlight array 110 consisting of multiple backlights" of the U.S. patent application Ser. No. 17/226,093, THREE-DIMENSIONAL DISPLAY METHOD BASED ON SPATIAL SUPERPOSITION OF SUB-PIXELS' EMITTED BEAMS). A thin-and-light optical structure constructed by the display device of orthogonal-characteristic 310 (with the requirement of different orthogonal characteristics between different pixel-groups is no longer mandatory), the microstructure array 112, and the controllable deflection device 111 of FIG. 15 can be used to replace the said conventional display screen projecting directional light beams, as shown in FIG. 17. Here, the outgoing light of the microstructure array 112 is shown as a parallel light. Better yet, relative to the conventional structure shown in FIG. 16, light beam passing through corresponding microstructure can be respectively endowed with an own controllable exit angle and exit direction. In this case, light beams from different pixel-groups can be guided to different viewing zones. As shown in the left graph of FIG. 18, light beams from the pixel-group of $p_1$, $p_4$, $p_7$, . . . are guided to the viewing zone $VZ_1$ by corresponding microstructures; light beams from the pixel-group of $p_2$, $p_5$, . . . are guided to the viewing zone $VZ_2$ by corresponding microstructures; light beams from the pixel-group of $p_3$, $p_6$, . . . are guided to the viewing zone $VZ_3$ by corresponding microstructures. As appropriate, the sizes of these different viewing zones can be designed different, and intervals between different viewing zones can also be designed different. At time-point t of a time cycle t~t+$\Delta$ t, the controllable deflection device 111 deflects incident beams by zero degree; at another time-point t+$\Delta$ t/2 of this time cycle t~t+$\Delta$ t, the controllable deflection device 111 deflects incident beams by a certain angle, thus forming viewing zones $VZ_4$, $VZ_5$, and $VZ_6$, as shown in the right graph of FIG. 18. Repeating this process in different time cycles, six viewing zones with desired shapes and desired intervals get presented based on the persistence of vision. The structure shown in the left graph of FIG. 18 can function as a display module. FIG. 18 gives an example of only one-dimensional case. It can be applied to a two-dimensional case similarly. In this application example, due to independent manipulation of each pixel by corresponding microstructure, the requirement of different orthogonal characteristics between different pixel-groups is not necessary any more. In FIG. 15 to FIG. 18, the connection between control device 60 and display device of orthogonal-characteristic is omitted for clarity. Example III, the M orthogonal-characteristic light sources and relay device 20 are replaced by M filter apertures on the spectral plane, which is switched on and off sequentially by the control device 60 at M time-points of each time cycle and only one filter aperture is switched on at a time-point. Each filter aperture is composed of L sub-filter apertures. The L sub-filter apertures of a filter aperture have a one-to-one correspondence with the L kinds of orthogonal characteristics, and each sub-filter aperture blocks light of non-corresponding orthogonal characteristics. An example is shown in FIG. 19, with K=2 sub-filter aperture $A_{11}$ and $A_{12}$ building up a composite filter aperture $A_1$; K=2 sub-filter aperture $A_{21}$ and $A_{22}$ building up a composite filter aperture $A_2$; K=2 sub-filter aperture $A_{31}$ and $A_{32}$ building up a composite filter aperture $A_3$. The M=3 filter apertures can be switched on and off sequentially at M=3 time-points of each time cycle. In this case, the display device of orthogonal-characteristic 310 is an active self-luminous device, or a passive non-self-luminous device with a backlight. Example IV, the M orthogonal-characteristic light sources and relay device 20 are replaced by a filter aperture on the spectral plane and a controllable deflection device 111, as shown in FIG. 20. Here, the filter aperture consists of L=2 sub-filter apertures $A_{s1}$ and $A_{s2}$ with different orthogonal characteristics, which only allow light from L=2 pixel-groups passing through, respectively. The controllable deflection device 111 deflects the parallel lights from the filter module 702 under the control of the control device 60, so to guide the light from the display device of orthogonal-characteristic 310 to the entrance pupil 405 along M directions. In this case, the display device of orthogonal-characteristic 310 can be an active self-luminous device, or a passive non-self-luminous device with a backlight.

Processes discussed above take pixels as basic display units. These processes can be applied to the case of subpixels as the basic display units.

Embodiment 2

Figure 21:
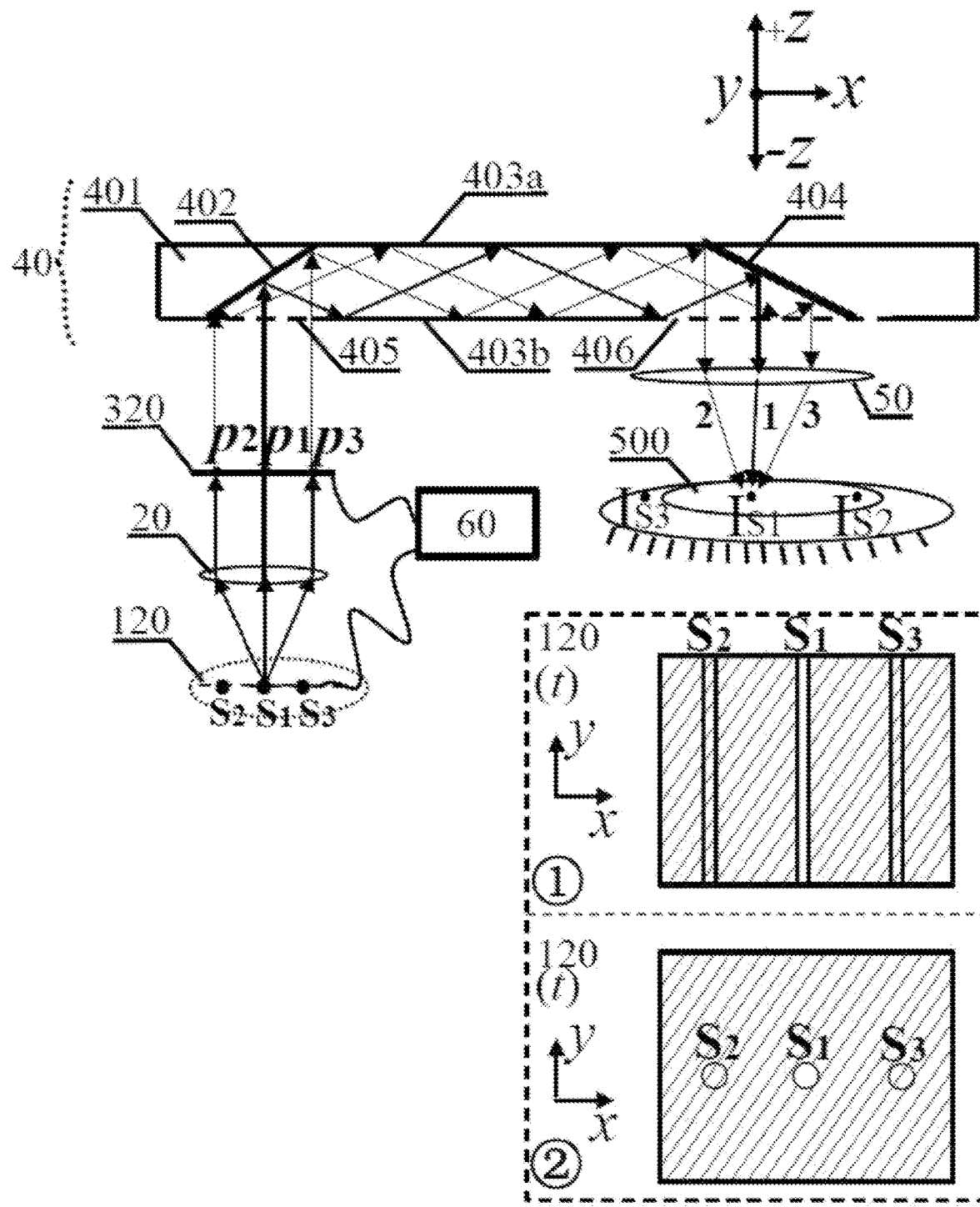
FIG. 21 is a schematic diagram of the display module with a light-source array of timing-characteristic.

FIG. 21 shows the basic structure of an optical-waveguide display module with multiple light sources, including a light-source array of timing-characteristic 120, a relay device 20, an ordinary display device 320, an optical wave-guide device 40, a converging device 50, and a control device 60. The control device 60 connects with the light-source array of timing-characteristic 120 and the ordinary display device 320. Wherein the light-source array of timing-characteristic 120 includes M≥2 ordinary light sources. FIG. 21 takes M=3 as an example. M=3 ordinary light sources are denoted as $S_1$, $S_2$, and $S_3$. M=3 ordinary light sources are switched on and off sequentially by the control device 60 at M=3 time-points of a time cycle. At a time-point, only one ordinary light source gets switched on, and projects light to the relay device 20. Specifically, at time-point t of the time cycle t~t+$\varDelta$ t, only the ordinary light source $S_1$ gets switched on, and ordinary light sources $S_2$ and $S_3$ are both switched off. At time-point t+$\varDelta$ t/3 of the time cycle t~t+$\varDelta$ t, only the ordinary light sources $S_2$ gets switched on, and the ordinary light sources $S_1$ and $S_3$ are both switched off. At time-point t+2$\varDelta$ t/3 of the time cycle t~t+$\varDelta$ t, only the ordinary light sources $S_3$ gets switched on, and ordinary light sources $S_1$ and $S_2$ are both switched off. The relay device 20 modulates the light from each ordinary light source to reduce divergence. In FIG. 21, specifically a lens is taken as the relay device 20, and the distance between the relay device 20 and the light-source array of timing-characteristic 120 is set to be equal to the focal length of the lens-type relay device 20. The light from a point of an ordinary light source is transformed into a parallel light along corresponding propagation direction by the relay device 20, and incidents onto the ordinary display device 320 as directional backlight. The ordinary display device 320 is composed of pixels, and each pixel plays the function of displaying optical information by modulating incident light. The optical waveguide device 40 shown in FIG. 21 is comprised of a wave-guide body 401, an entrance pupil 405, a couple-in element 402, reflecting surfaces 403a and 403b, a couple-out element 404, and an exit pupil 406. The function of the optical waveguide device 40 is to guide light from the ordinary display device 320 to the observing zone for the pupil 500. The guiding process is described as follows: light from a sub-light source enters the wave-guide body 401 through the entrance pupil 405; then, guided by the couple-in element 402 and reflected by the reflecting surfaces 403a and 403b, the light propagates in the wave-guide body 401 toward the couple-out element 404; the couple-out element 404 guides the light from each sub-light source to exit the wave-guide body 401 through the exit pupil 406 along the corresponding direction. The converging device 50 is positioned before the couple-out element 404 along the light propagation direction, to converge the light from each sub-light source to the observing zone for the pupil 500 of the viewer. In FIG. 21, the converging device 50 take a lens as example, the couple-in element 402 and the couple-out element 404 both take reflective surface as examples, the entrance pupil 405 and the exit pupil 406 are drawn as dashed lines.

FIG. 21 shows the state at time-point t of a time cycle t~t+$\varDelta$ t, as an example. At this time-point, the ordinary light sources $S_1$ is switched on. The lights emitted by the ordinary light sources $S_1$ converge to the corresponding converging spots $I_{S1}$, through the relay device 20, the ordinary display device 320, the optical waveguide device 40 and the converging device 50. For each converging spot, its concrete shape depends on that of the corresponding sub-light source. For clarity purpose, only three pixels $p_1$, $p_2$, and $p_3$ and corresponding light beams are shown in FIG. 21. Taking pixel $p_1$ as an example, it modulates a beam of light from the ordinary light source $S_1$. The modulated light beam from the pixel $p_1$ enters the wave-guide body 401 through the entrance pupil 405, and then propagates along the wave-guide body 401 by the couple-in element 402 and the reflecting surfaces 403a and 403b. The couple-out element 404 guides modulated light beam to exit the wave-guide body 401, and to pass through the exit pupil 406. Finally, through the converging device 50, this modulated light beam reaches to converging spot $I_{S1}$ along the direction "1". The converging spots corresponding to all ordinary light sources construct the observing zone for the pupil 500. Obviously, the modulated light beams from the pixels $p_2$ and $p_3$ are guided to the converging spot $I_{S1}$ along the direction "2" and "3", respectively. Similarly, at a time-point, for any pixel, the modulated light beam is guided to the converging spot corresponding to the corresponding ordinary light source. At a time-point, the optical information loaded by a pixel is the projection information of the displayed scene along the light beam from this pixel and reaching to the observing zone. The optical information loaded by the ordinary display device 320 is a two-dimensional image of the displayed scene. Then, at the time-point t of a time cycle t~t+$\varDelta$ t, the light emitted by the ordinary light source $S_1$ is modulated by the ordinary display device 320, and then converges to the converging spot $I_{S1}$ with the corresponding two-dimensional image of the displayed scene.

Similarly, at time-point t+$\varDelta$ t/3, the ordinary display device 320 projects the corresponding two-dimensional image to converging spot $I_{S2}$. At time point t+2$\varDelta$ t/3, the ordinary display device 320 projects the corresponding two-dimensional images to converging spot $I_{S3}$. Then, in a time cycle t~t+$\varDelta$ t, the ordinary display device 320 projects M=3 different two-dimensional images to the M=3 converging spots, respectively.

In other time cycles, the above process is performed in the same way, M=3 different two-dimensional images are projected to the M=3 converging spots in the observing zone sequentially.

The ordinary light sources are categorized into two types. The first type of ordinary light source takes a linear shape. This kind of ordinary light sources are called linear-shaped ordinary light sources. Here, the linear shape means a shape with unequal length and width, not means a "straight line" in a strict sense. The M=3 linear-shaped ordinary light sources are arranged along a one-dimensional direction, as shown in the dashed frame ① in FIG. 21. Here, M=3 ordinary light sources are arranged along the x direction, and all ordinary light sources are with the long direction along the y direction. In FIG. 21, the pupil 500 of the viewer is located on the plane containing all the converging spots. Two reasons make the linear-shaped converging spot having a real size along the arrangement direction (x-direction). The first one is due to the width of the corresponding ordinary light source, and the second is related with the diffraction introduced by the pixel structure. For each linear-shaped converging spot, the area where the light intensity is not less than 50% of the maximum value is set as the viewing zone of the projected two-dimensional image. Along the x-direction, the size of each viewing zone is designed to be less than $D_p$. Here, $D_p$ is the diameter of the pupil 500. Under this premise, when at least two viewing zones intersect with the pupil 500 in the observing zone, that is to say when the x-direction distance between adjacent viewing zones is less than $D_p$, at least two two-dimensional images projected by the ordinary display device 320 to these at least two viewing zones will be perceived by the pupil 500 in each time cycle. For a displayed spatial point, based on the persistence of vision, at least two passing-through light beams from the at least two two-dimensional images overlap into a spatial light spot that the eye can focus on naturally, with the VAC being kicked off successfully by the More-than-one-view-one-pupil technology. In a display system, the pupil 500 always needs an eye-box, which provides a space for the reasonable moving of the pupil 500. At any position of the eye-box, the pupil needs to intersect with at least two viewing zones. Compared with point-shaped viewing zones, the linear-shaped viewing zones resulting from linear-shaped ordinary light sources have an advantage that only one-directional arrangement of viewing zones is necessary, which alleviates the excessive requirements on the number of viewing zones when an eye-box for the pupil 500 is constructed. Constructing such an eye-box, the point-shaped viewing zones need to be arranged along two dimensions.

In FIG. 21, the viewing zones corresponding to converging spots $I_{S1}$ and $I_{S2}$ contact with the pupil 500, and the VAC-free display get implemented based on the More-than-one-view-one-pupil technology. The pupil 500 may also deviate from the surface containing the converging spots. In this case, the pupil 500 may not be able to receive all light beams of a whole two-dimensional image projected at a time-points. Actually, different parts of two-dimensional images projected at different time-points can splice into a two-dimensional splicing image. When at least two two-dimensional splicing images, or at least one two-dimensional image and one two-dimensional splicing image are perceived by a pupil in each time cycle, More-than-one-view-one-pupil display can also get implemented.

In the case of a linear-shaped ordinary light source, the modulated beam which exits each pixel is a divergent beam, with a convergence angle along the long direction larger than that along the width direction. The waist location of the modulated beam perceived by the pupil 500 in the yz plane can be modulated along the depth direction (z-direction) to a position around the displayed scene. The converging device 50 can play this function, for example, the converging device 50 in FIG. 2 which is made up with a y-direction concave cylindrical lens 501 and a convex lens 502. The y-direction concave cylindrical lens only modulates the incident light along the y direction.

Another type of ordinary light source is with point shape. This kind of ordinary light sources are called point-shaped ordinary light sources. The physical point-shaped ordinary light source is of a size with approximately equal length and width. The M=3 point-shaped ordinary light sources are arranged along x-direction, as shown in the dashed frame ② in FIG. 1, where a circle "○" is used to represent a point-shaped ordinary light source. These M=3 point-shaped ordinary light sources $S_1$, $S_2$, $S_3$ correspond to converging spots $I_{S1}$, $I_{S2}$, $I_{S3}$, respectively. The point-shaped converging spot also occupies a non-zero area. For each point-shaped converging spot, the area where the light intensity is not less than 50% of the maximum value is set as the viewing zone of the two-dimensional image corresponding to the corresponding ordinary light source. Along the arrangement direction of the converging spots, the size of each viewing zone is designed less than $D_p$. Under this premise, when at least two viewing zones intersect with the pupil 500 in the observing zone, that is to say when the distance between two adjacent viewing zones is less than $D_p$, at least two-dimensional images will be perceived by the pupil 500 in each time cycle. For each displayed spatial point, at least two passing-through light beams from these at least two two-dimensional images overlap into a spatial light spot that the eye can focus on naturally based on the persistence of vision, thus the VAC being kicked off successfully based on the More-than-one-view-one-pupil technology. In a display system, the pupil 500 always needs an eye-box, which provides a space for reasonable movements of the pupil 500. At any position of the eye-box, the pupil needs to intersect with at least two viewing zones. Constructing such an eye-box, the point-shaped viewing zones need to be arranged along two dimensions. Here, only one-dimensional point-shaped viewing zones are shown as example for simplicity.

In FIG. 21, convergence points $I_{S1}$ and $I_{S2}$ fall into the pupil 500, and More-than-one-view-one-pupil display can get implemented.

In FIG. 21, the pupil 500 is set on the surface containing the converging spots. The pupil 500 may also deviate from this surface. Under this condition, when at least two two-dimensional splicing images, or at least one two-dimensional image and one two-dimensional splicing image are perceived by a pupil in each time cycle, More-than-one-view-one-pupil display can also get implemented.

When point-shaped viewing zones are presented, Maxwellian view display can get implemented for VAC-free display, if only one two-dimensional image, or only one two-dimensional splicing image is perceived by the pupil 500 in each time cycle. When more than one two-dimensional image or one two-dimensional splicing image are perceived by the pupil 500, but the perceived optical information is not enough to contain two two-dimensional images (or two two-dimensional splicing images, or one two-dimensional image and one two-dimensional splicing images), the two mechanisms of More-than-one-view-one-pupil and Maxwellian view work together.

With point-shaped ordinary light sources, the arrangement of the ordinary light sources can also be along two-dimensional directions. In this embodiment, said one-dimension direction can be a direction along a straight line or along a curved line.

Figure 22:
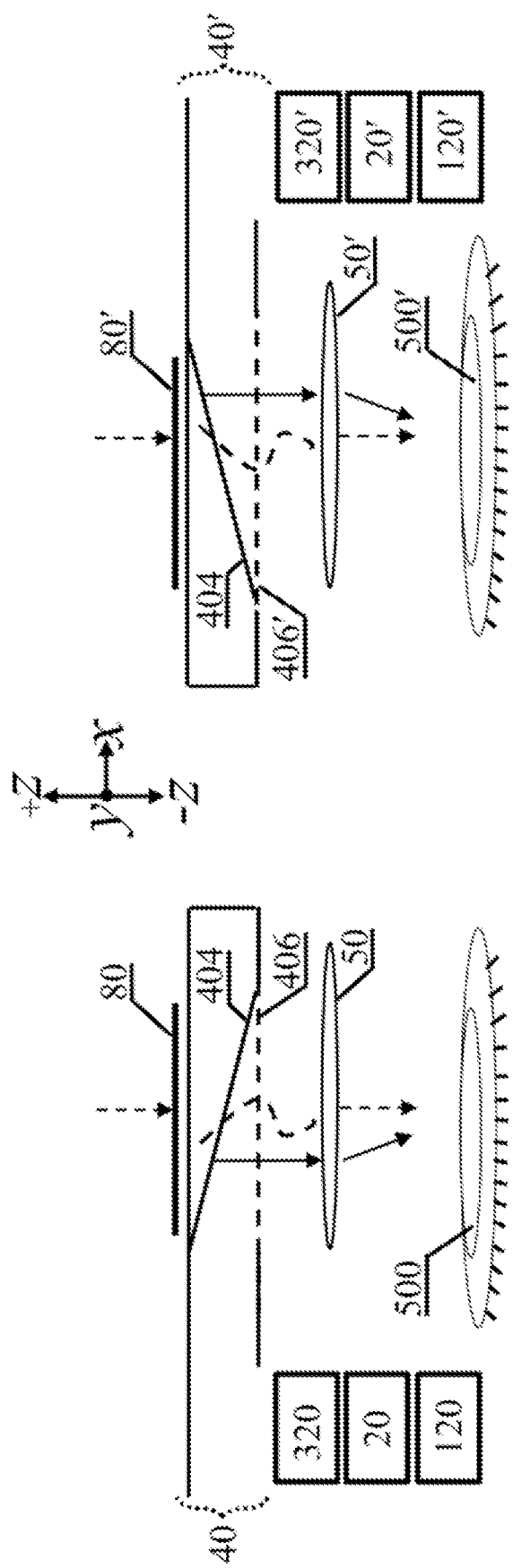
FIG. 22 shows a binocular display system taking display modules with two display modules with light-source arrays of timing-characteristic being taken as two eyepieces.

The optical-waveguide display module with multiple light sources in this embodiment can be used as an eyepiece. Two such eyepieces construct a binocular display system as shown in FIG. 22. In FIG. 22, the two display modules for two pupils 500 and 500' are shown, with some parts replaced by line frame boxes, and some parts are omitted. Such simplification is easy to be understood by professional staff in three-dimensional display field, and will also appear in the following segments without explanation any longer.

Figure 23:
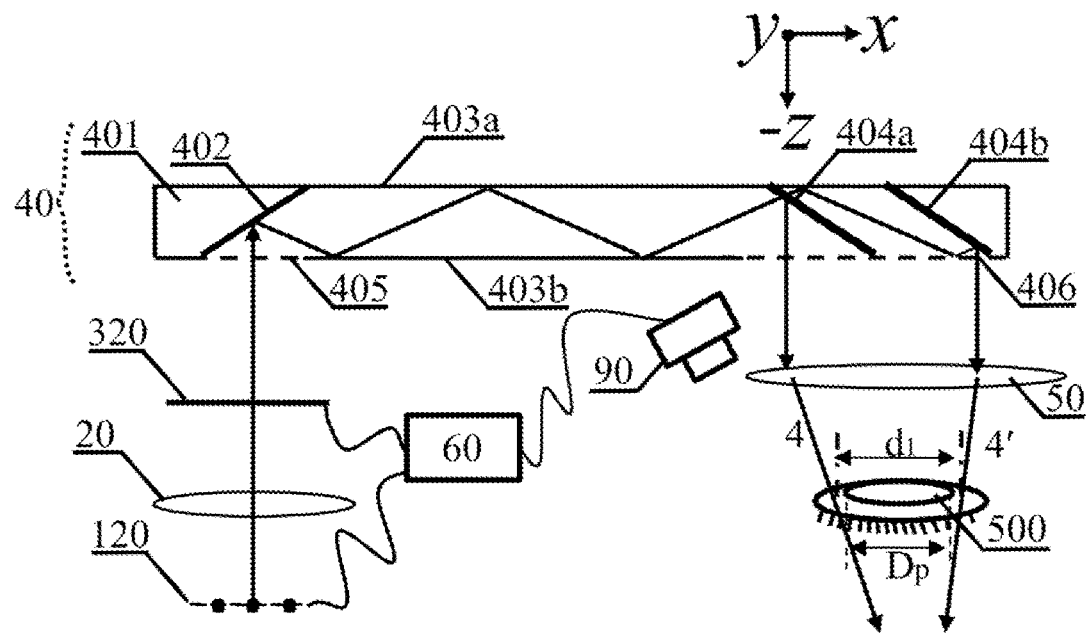
FIG. 23 shows a couple-out element consisted of two components in a display module with a light-source array of timing-characteristic.
Figure 24:
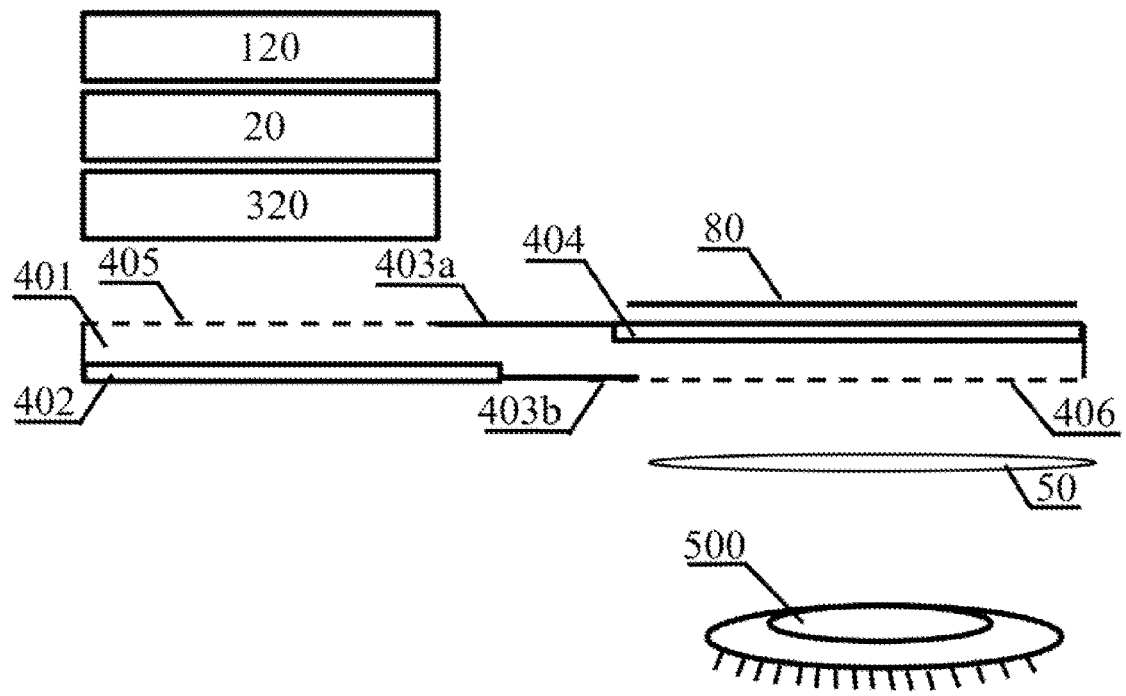
FIG. 24 shows an optical waveguide device with another type of couple-in element and couple-out element in a display module with a light-source array of timing-characteristic.

The optical waveguide device 40 shown in FIG. 21 can adopt a multi-component couple-out element 404, which is composed of more than one component elements for exit-pupil-expansion. Under this condition, at a time-point, a light beam from a pixel will incident onto the couple-out element 404 more than once, being guided to the exit pupil by different component elements of the multi-component couple-out element 404 as light beams propagating along different light paths. In the patent application, light beams with different light paths are taken as different light beams with different directions. That is to say, due to the existence of the multi-component couple-out element 404, the different light beams from a same pixel propagate to the observing zone with same optical information at a time-point. In this patent application, such different light beams from a same pixel should be prevented from entering into the pupil 500 simultaneously. So, this patent application takes "a pixel of the ordinary display device projects at most one beam of light into the pupil 500 of the viewer at a time-point" of Claim 18 as a prerequisite. When exit-pupil-expansion gets implemented in the optical waveguide device 40, the different light beams from a same pixel at a same time-point should have a distance large enough for not entering into the pupil 500 simultaneously. For example, the multi-component couple-out element 404 is consisted of a semitransparent surface 404a and a reflective surface 404b in FIG. 23. Guided by these two component elements, two light beams along the directions "4" and "4'", which are from a same pixel at a same time-point, have an interval of $d_1 > D_p$ on the plane containing the pupil 500. Under this condition, a tracking device 90, which is used for real-timely tracking and determining a spatial position of the pupil 500, should be introduced into the display module, to determine which light beam from each pixel enters into the pupil 500 at a time-point. Then, for each pixel, the control device 60 refreshes this pixel with the projection information of the displayed scene along its light beam that enters into the pupil 500. A compensation unit 80 can also be designed to eliminate the impact of the converging device 50 on the incident light from the external environment, as shown in FIG. 24.

In above figures, the couple-in element 402 and the couple-out element 404 take semitransparent surface and reflective surface as example. Actually, other existing or yet-to-be-developed kinds of optical waveguides can be taken as the optical waveguide device 40 of this patent. For example, the optical waveguide shown in FIG. 24, which takes grating elements or holographic elements as the couple-in element 402 and the couple-out element 404. With exit-pupil-expansion being designed, the multi-component couple-out element 404 is also needed. Concretely, the component elements of a multi-component couple-out element 404 can be arranged separated, adjacent, or partial overlapped.

Figure 25:
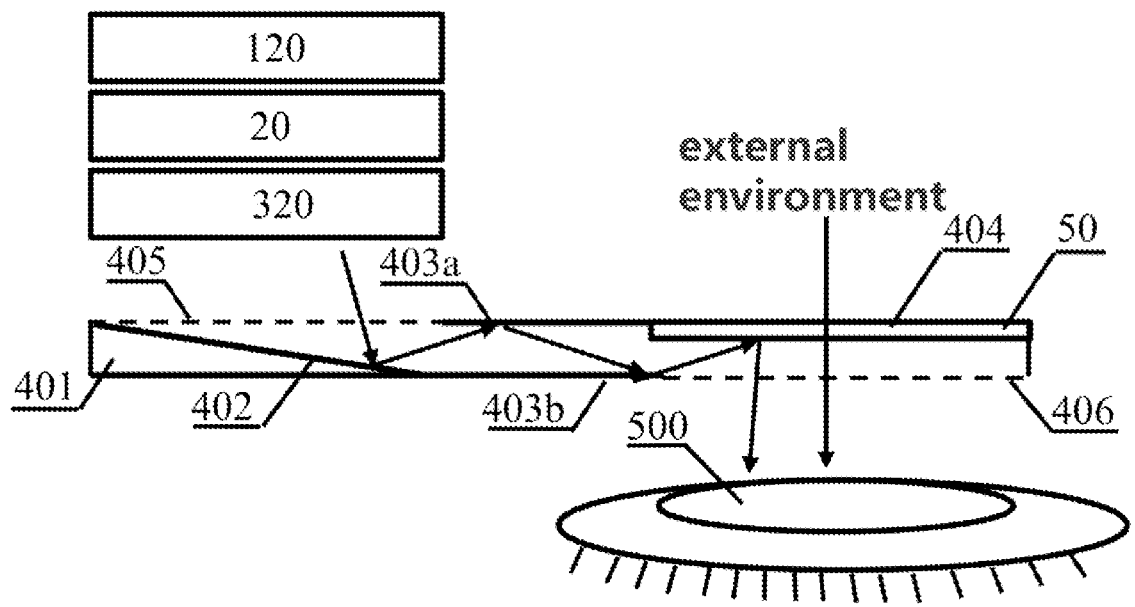
FIG. 25 is a structural diagram of a display module taking a light-source array of timing-characteristic with the converging device being integrated into the couple-out element.

The function of the converging device 50 can also be integrated into the optical waveguide device 40. For example, a holographic-element can play both functions of out-coupling device 404 and converging device 50 as shown in FIG. 25, with the converging device 50 playing the function of a reflective concave lens. When the holographic-element can be designed having no effect on the light from external environment with an incident angle near to 90 degree, the compensation unit 80 is not necessary any more. Actually, the optical-waveguide display module with multiple light sources can be used as an eyepiece of an AR display system.

Figure 26:
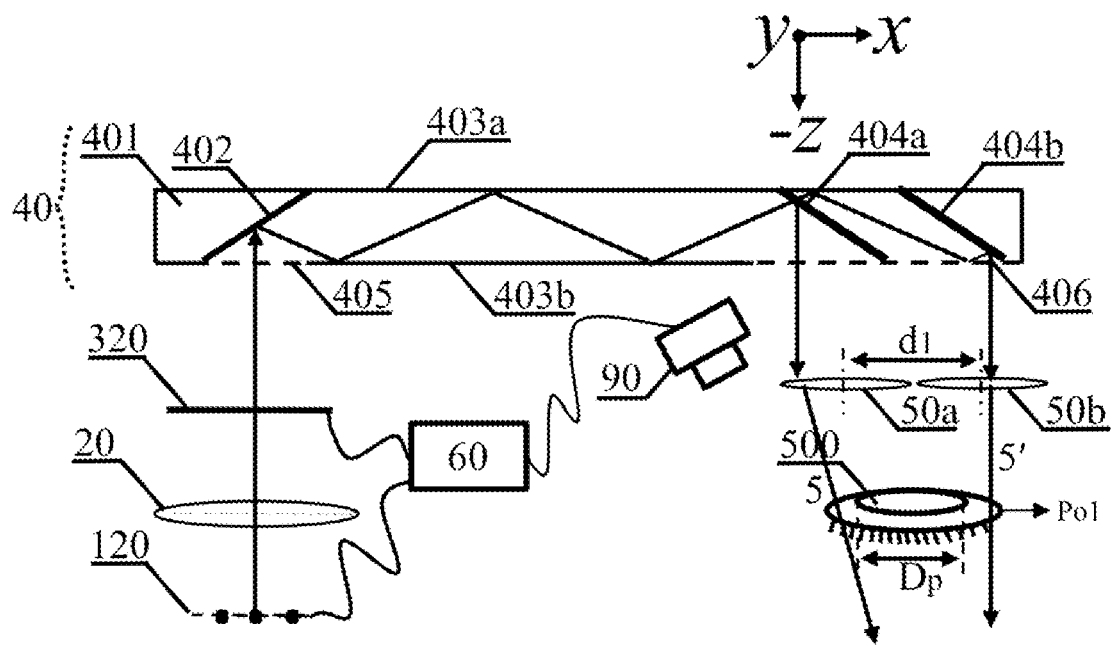
FIG. 26 is a structural diagram of a display module taking a light-source array of timing-characteristic with the converging device being consisted of two components.
Figure 27:
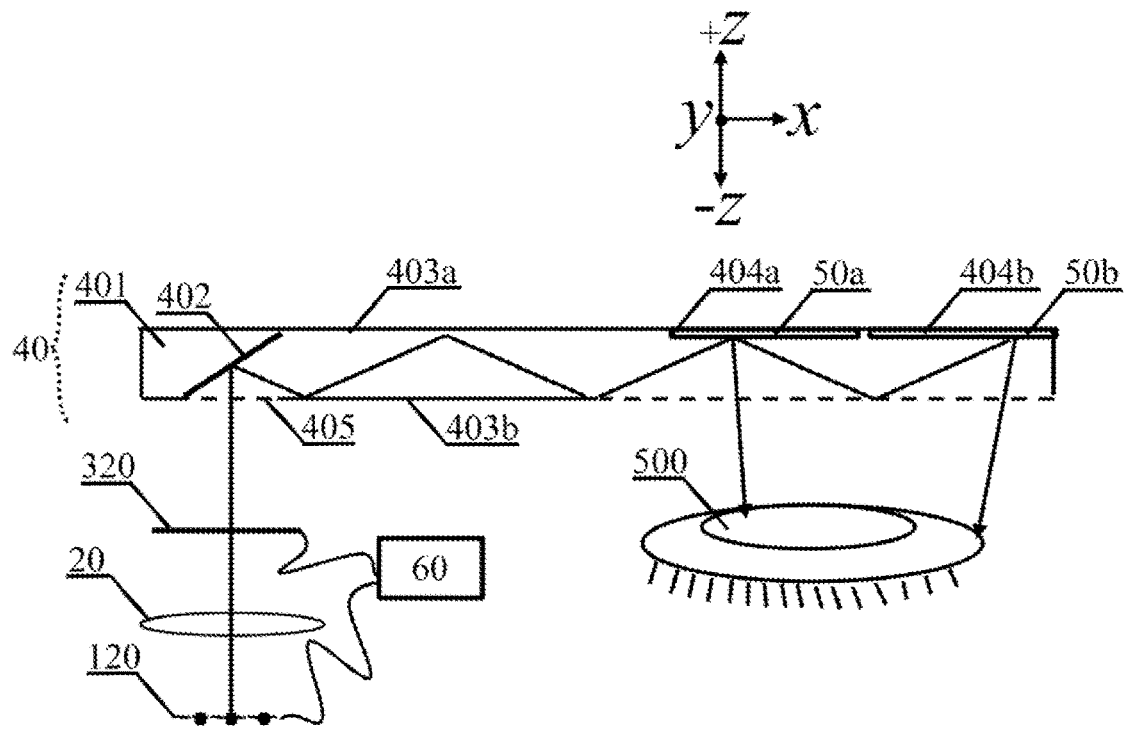
FIG. 27 is a structural diagram of a display module taking a light-source array of timing-characteristic with the multi-component converging device being integrated into the couple-out element.

It is worth noting that when considering exit-pupil-expansion, at a same time-point, different light beams from a pixel, guided out by different component elements of the multi-component couple-out element 404, may inevitably enter the pupil 500 simultaneously. For example, in FIG. 23, the light beams along the directions "4" and "4'" will converge into a common point on the focal plane of the converging device 50. If the pupil 500 is exactly at the focal plane, these two light beams will enter into the pupil 500 simultaneously unavoidably. To solve this problem, a multi-component converging device 50 can help. The multi-component converging device 50 is composed of multiple component elements, for example two lenses 50a and 50b as shown in FIG. 26. Preferably, the two lenses correspond to the two component elements of the multi-component couple-out element 404, respectively. Thus, light beams from a same pixel at a same time-point can get separated by the multi-component converging device 50 for avoiding entering into the pupil 500 simultaneously, such as the example shown in FIG. 26. Similarly, the multi-component converging device 50 can also be integrated into the multi-component couple-out element 404, such as the example shown in FIG. 27.

In the example shown in FIG. 21, the light emitted by a point of an ordinary light source is converted into a parallel backlight by the relay device 20 for the ordinary display device 320. The backlight from a point of an ordinary light source may be in a non-parallel state. For example, the light from a point of an ordinary light source enters the optical waveguide device 40 as a convergent beam. The convergent beams make a converging spot closer to the condensing device 50.

As described above, the optical-waveguide display module with multiple light sources in this embodiment can project M two-dimensional images of the displayed scene in each time cycle. A larger value of M requires an ordinary display device 320 with a higher frame rate, to guarantee a necessary display frequency (display frequency=frame rate of the ordinary display device 320/M) for flicker-free display.

Figure 28:
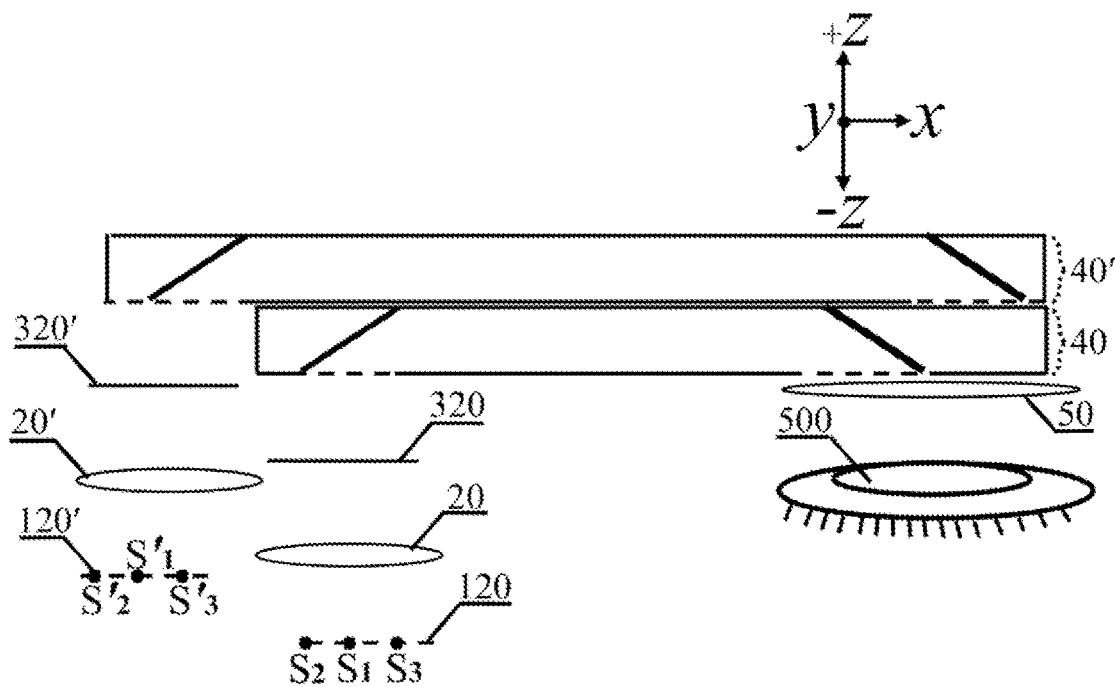
FIG. 28 is a schematic diagram of a compound display module stacked by two element display modules with light-source arrays of timing-characteristics.

N (N≥2) optical-waveguide display modules with multiple light sources can stack together as a compound display module, for projecting N×M two-dimensional images in a time cycle. In the case, said optical-waveguide display module with multiple light sources is taken as an element display module. Taking N=2, FIG. 28 shows an example of a compound display module. The light-source arrays of timing-characteristics 120 and 120' are with M=3 ordinary light sources, respectively. At each time-point, N=2 ordinary light sources, which belong to the N=2 element display modules respectively, are switched on. N×M=6 ordinary light sources are switched on and off sequentially at M=3 time-points in each time cycle. Thus, at a time-point, N=2 ordinary light sources from N=2 element display modules are switched on synchronously, with N=2 ordinary display devices 320 and 320' refreshed by corresponding optical information. Similarly, VAC-free display gets implemented based on persistence of visual, with more viewing zones generated. In the compound display module, different element display modules may share a common control device 60, or a common converging device 50, or a common compensation unit 80 as needed. An element display module can also adopt multi-component couple-out element 404 or/and multi-component converging device 50.

Among the M ordinary light sources, the viewing zones corresponding to K ordinary light sources (2≤K<M) are enough for Maxwellian view or More-than-one-view-one-pupil display to the pupil 500. In this case, according to the position of the pupil 500 detected by the tracking device 90, the control device 60 determines the corresponding K ordinary light sources, and then carries out the display by a time cycle of K time-points. There is another case that only one ordinary light source switched on at a time-point is enough for Maxwellian view display for the pupil 500. In this case, at each time-point, according to the position of the pupil 500 detected by the tracking device 90, the control device 60 determines the corresponding ordinary light source, and then carries out the display at this time-point. The process discussed above is also applicable to the compound display module, by selecting needed ordinary light source(s) from the N×M ordinary light sources.

In the compound display module shown in FIG. 28, the viewing zones belong to different element display modules may overlap mutually, with the two-dimensional images from different element display modules being spliced together for a larger field of view.

Figure 29:
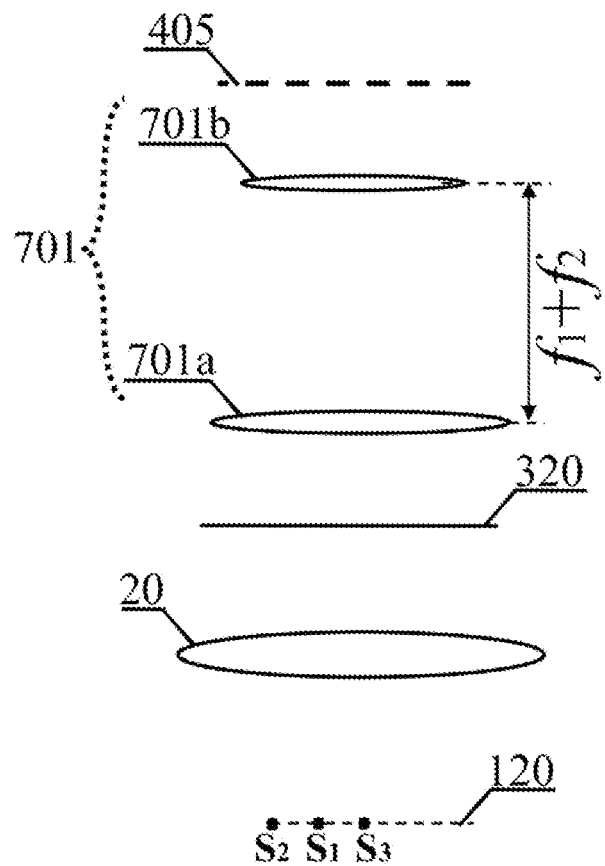
FIG. 29 shows a schematic diagram of a zooming in/out element, which functions as an auxiliary relay device of the display module with light-source arrays of timing-characteristics.
Figure 30:
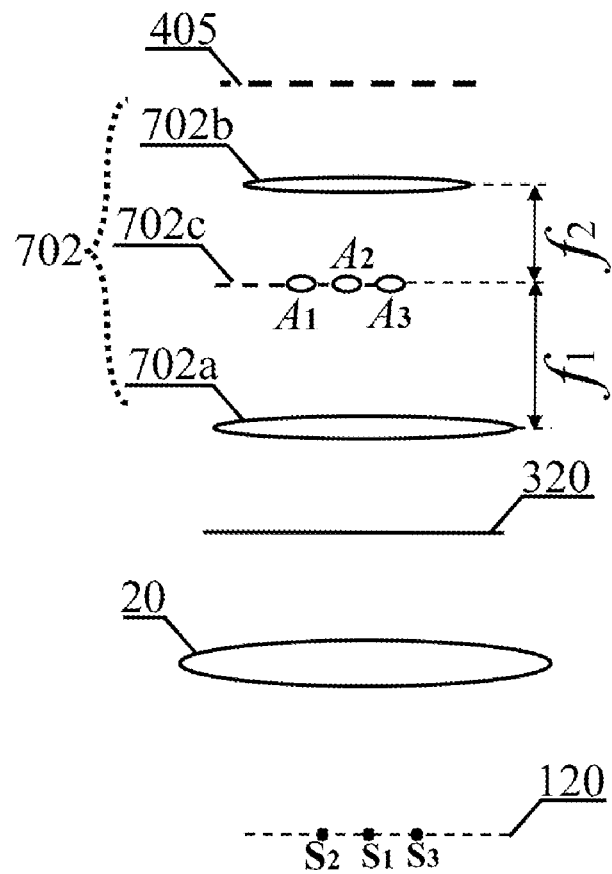
FIG. 30 shows a schematic diagram of a filter module, which functions as an auxiliary relay device of the display module with light-source arrays of timing-characteristics.

The auxiliary relay device 70 can be a zooming in/out element 701. For example, a lens 701a and a lens 701b shown in FIG. 29 construct a zooming in/out element 701. It adjusts the size of the light distribution zone of the light projected by the ordinary display device 320 at the entrance pupil 405. The distance between the lens 701a and the lens 701b is optimally equal to the sum of their focal lengths f1 and f2. The auxiliary relay device 70 can also be a filter component 702, which projects the spectral plane of the ordinary display device 320 and perform filtering on the spectral plane. FIG. 30 shows an example of a filter component 702, which is composed of a lens 702a, a lens 702b, and a filter aperture array 702c. The lens 702a projects the spectral plane of the ordinary display device 320 on the common focal plane of the lens 702a and the lens 702b. A filter aperture array 702c is placed on the spectral plane. Apertures of the filter aperture array 702c correspond to the ordinary light sources by a one-to-one manner, to block high-order diffraction light from the ordinary display device 320. For a point-shaped ordinary light source, the corresponding aperture of the filter aperture array 702c is set as a small hole; for a linear-shaped ordinary light source, the corresponding aperture of the filter aperture array 702c is set as a slit. The distance between lens 702a and lens 702b also may be not equal to the sum of their focal lengths f1 and f2. As long as the filter aperture array 702c is placed on the focal plane of lens 702a, filtering can be performed. The auxiliary relay device 70 can also furtherly be a guiding device 703, which reflects and deflects the projected light from the ordinary display device 320 to the entrance pupil 405, such as the mirror shown in FIG. 12.

In above mentioned figures, the ordinary display device 320 can also be a reflection-type display device. In this case, the positions of the light-source array of timing-characteristic 120 and the relay device 20 need to be adjusted accordingly.

Similar to the cases shown in FIG. 14 to FIG. 18, the function of the M ordinary light sources discussed in this embodiment can be carried out by an ordinary light source/a controllable deflection device 111, or M filter apertures on the spectral plane of the ordinary display device 320, or a filter aperture on the spectral plane/a controllable deflection device 111, or a microstructure array 112/a controllable deflection device 111. The difference lies in that, in this embodiment, the ordinary light source is with no sub-light sources, and the filter aperture is with no sub-apertures.

The core idea of the present invention is to introduce the light source array into the optical-waveguide display engine. Through the timing multiplexing of the light sources, one or at least two two-dimensional projection images of the displayed scene are projected into the pupil 500 of the viewer, for VAC-free Maxwellian view display or VAC-free More-than-one-view-one-pupil display. The linear-shaped light sources are designed alleviate the excessively high requirements on the number of light sources. And orthogonal characteristics are endowed to the display device and light sources for increasing the number of two-dimensional images being able to project by the display module. A light and thin display module get implemented by the introduce of optical waveguide structure.

The above are only preferred embodiments of the present invention, but the design concept of the present invention is not limited to this. For example, the existing various optical waveguide display engines all can be used as the optical waveguide devices of this patent, for example, an optical waveguide display engine that is formed by stacking three monochromatic (R, G, B) optical waveguide devices and can perform color optical information projection. Another example, the microstructure can adopt all kind of available devices, capable of modulating the exit angle and exit direction of incident light beam. Actually, any insubstantial modifications made to the present invention using this concept also fall within the protection scope of the present invention.

What is claimed is:

1. An optical-waveguide display module with multiple light sources, comprises:
    a light-source array of timing-orthogonal-characteristic comprised of M orthogonal-characteristic light sources, which are switched on and off sequentially at M time-points of each time cycle, with only one orthogonal-characteristic light source being switched on at a time-point, where $M \geq 2$;
    wherein each orthogonal-characteristic light source is composed of L sub-light sources, which have a one-to-one correspondence with L kinds of orthogonal characteristics, and a sub-light source only emits light of corresponding orthogonal characteristic, where $L \geq 2$;
    a relay device, which is designed to modulate the light from the light-source array of timing-orthogonal-characteristic, for reducing divergence of the light beam from each sub-light source;
    a display device of orthogonal-characteristic comprising multiple pixels, which modulates the light from the relay device with optical information;
    wherein the pixels or subpixels of the display device of orthogonal-characteristic are divided into L pixel-groups or L subpixel-groups, with all the L pixel-groups or all the L subpixel-groups taking a one-to-one correspondence with the L sub-light sources of each orthogonal-characteristics light source, and each pixel-group or each subpixel-group blocking light from non-corresponding sub-light sources;
    an optical waveguide device, which guides light from the display device of orthogonal-characteristic;
    a converging device, for converging light from the optical waveguide device to the observing zone of a pupil of a viewer;
    a control device, which is connected with the light-source array of timing-orthogonal-characteristic and the display device of orthogonal-characteristic, for controlling the sequential switching of the orthogonal-characteristic light sources and the synchronous refreshing of optical information loaded onto the display device of orthogonal-characteristic;
    wherein a pixel or a subpixel of the display device of orthogonal-characteristic projects at most one beam of light into the pupil of the viewer at a time-point, with the optical information refreshed synchronously by the pixel or the subpixel being a projection information of a displayed scene along its light beam projected into the pupil.

2. The optical-waveguide display module with multiple light sources according to claim 1, wherein the optical waveguide device comprises a wave-guide body, an entrance pupil, a couple-in element, reflecting surfaces, a couple-out element, and an exit pupil;
    wherein the light from the display device of orthogonal-characteristic enters the wave-guide body through the entrance pupil; then, guided by the couple-in element and reflected by the reflecting surfaces, the light propagates in the wave-guide body toward the couple-out element; the couple-out element guides the light from each sub-light source to exit the wave-guide body through the exit pupil along a corresponding direction.

3. The optical-waveguide display module with multiple light sources according to claim 1, wherein the sub-light sources are linear-shaped, and a number of light beams projected into the pupil in a time cycle is not less than a pixel number of two pixel-groups or a subpixel number of two subpixel-groups, under a premise that all pixels or all subpixels are loaded with optical information.

4. The optical-waveguide display module with multiple light sources according to claim 1, wherein the sub-light sources are point-shaped, and a number of light beams projected into a pupil in a time cycle is not less than a pixel number of one pixel-group or a subpixel number of one subpixel-group under a premise that all pixels or all subpixels are loaded with optical information.

5. The optical-waveguide display module with multiple light sources according to claim 1, wherein the converging device is integrated into the optical waveguide device.

6. The optical-waveguide display module with multiple light sources according to claim 1, wherein the optical-waveguide display module further comprises an auxiliary relay device, which is inserted into the light path to modulate the incident light of the optical waveguide device.

7. The optical-waveguide display module with multiple light sources according to claim 6, wherein the auxiliary relay device is a zooming in/out element, for adjusting the projection size of the light from the display device of orthogonal-characteristic.

8. The optical-waveguide display module with multiple light sources according to claim 6, wherein the auxiliary relay device is a filter module, which projects the spectral plane of the display device of orthogonal-characteristic and performs filtering on the spectral plane.

9. The optical-waveguide display module with multiple light sources according to claim 6, wherein the auxiliary relay device is a guiding device, which guides the light from the display device of orthogonal-characteristic to the couple-in element of the optical waveguide device.

10. The optical-waveguide display module with multiple light sources according to claim 1, wherein the optical-waveguide display module further comprises a compensation unit, which is designed to eliminate the effect of the converging device on the incident light from the external environment.

11. The optical-waveguide display module with multiple light sources according to claim 1, wherein the optical-waveguide display module further comprises a tracking device connected to the control device, for tracking the spatial position of the pupil.

12. The optical-waveguide display module with multiple light sources according to claim 11, wherein according to the real-time spatial position of the pupil, the control device switches on and off corresponding K orthogonal-characteristic light sources at K time-points of a time cycle, with the display device of orthogonal-characteristic refreshed by corresponding optical information synchronously, where $2 \leq K < M$.

13. The optical-waveguide display module with multiple light sources according to claim 11, wherein according to the real-time spatial position of the pupil at a time-point, a corresponding orthogonal-characteristic light source is switched on by the control device, with the display device of orthogonal-characteristic refreshed by corresponding optical information synchronously.

14. The optical-waveguide display module with multiple light sources according to claim 1, wherein the M orthogonal-characteristic light sources are replaced by an orthogonal-characteristic light source and a controllable deflection device;
wherein the controllable deflection device can deflect the light from the orthogonal-characteristic light source under control of control device, to provide backlights to the display device of orthogonal-characteristic along M directions,
or the controllable deflection device can deflect the light from the display device of orthogonal-characteristic, to incident onto the entrance pupil along M directions.

15. The optical-waveguide display module with multiple light sources according to claim 1, wherein the M orthogonal-characteristic light sources and the relay device are replaced by a controllable deflection device, which can deflect the light from the display device of orthogonal-characteristic under control of the control device;
wherein a microstructure array comprising microstructures is attached to the display device of orthogonal-characteristic, with the microstructures taking a one-to-one relationship to the pixels or the subpixels for modulating exit angles and exit directions of the exiting beams;
wherein the display device of orthogonal-characteristic is an active self-luminous device, or a passive non-self-luminous device with a backlight, and the requirement of different orthogonal characteristics between different pixel-groups or different subpixel-groups are no longer mandatory.

16. The optical-waveguide display module with multiple light sources according to claim 8, wherein the M orthogonal-characteristic light sources and relay device are replaced by M filter apertures on the spectral plane, which is switched on and off sequentially by the control device at M time-points of each time cycle and only one filter aperture is switched on at a time-point;
wherein a filter aperture is composed of L sub-filter apertures which take a one-to-one correspondence with the L kinds of orthogonal characteristics, and each sub-filter aperture blocks light of non-corresponding orthogonal characteristics;
wherein the display device of orthogonal-characteristic is an active self-luminous device, or a passive non-self-luminous device with a backlight.

17. The optical-waveguide display module with multiple light sources according to claim 8, wherein the M orthogonal-characteristic light sources and the relay device are replaced by a filter aperture on the spectral plane and a controllable deflection device;
wherein the controllable deflection device can deflect the light from the filter module under control of the control device, to guide the light from the display device of orthogonal-characteristic to the entrance pupil along M directions;
wherein the display device of orthogonal-characteristic is an active self-luminous device, or a passive non-self-luminous device with a backlight.

18. An optical-waveguide display module with multiple ordinary light sources, comprising:
a light-source array of timing-characteristic comprising M ordinary light sources, which are switched on and off sequentially at M time-points of each time cycle, with only one ordinary light source being switched on at a time-point, where $M \geq 2$;
a relay device, which is designed to modulate the light from the light-source array of timing-characteristic, for reducing divergence of the light beam from each ordinary light source;
an ordinary display device comprising multiple pixels, which modulates the light from the relay device with optical information;

an optical waveguide device, which guide light from the ordinary display device;
a converging device, to converge the light from the optical waveguide device to the observing zone for a pupil of the viewer;
a control device, which is connected with the light-source array of timing-characteristic and the ordinary display device, to control the sequential switching of the ordinary light sources and the synchronous refreshing of optical information loaded onto the ordinary display device;
wherein a pixel of the ordinary display device projects at most one beam of light into the pupil of the viewer at a time-point, with the optical information refreshed synchronously by the pixel being the projection information of the displayed scene along its light beam projected into the pupil, and a pixel projects at least one light beam into the pupil of the viewer in each time cycle when the pixel is always loaded with optical information at all time-points.

19. The optical-waveguide display module with multiple ordinary light sources according to claim 18, wherein the optical waveguide device is comprises a wave-guide body, an entrance pupil, a couple-in element, reflecting surfaces, a couple-out element, and an exit pupil;
wherein the light from the ordinary display device enters the wave-guide body through the entrance pupil; then, guided by the couple-in element and reflected by the reflecting surfaces, the light propagates in the wave-guide body toward the couple-out element; the couple-out element guides the light from each ordinary light source to exit the wave-guide body through the exit pupil along a corresponding direction.

20. The optical-waveguide display module with multiple ordinary light sources according to claim 18, wherein the ordinary light sources are linear-shaped;
wherein a pixel of the ordinary display device projects at least two light beams into the pupil of the viewer in each time cycle when this pixel is always loaded with optical information at all time-points.

21. The optical-waveguide display module with multiple ordinary light sources according to claim 18, wherein the ordinary light sources are point-shaped;
wherein under an assumption that all pixels are always loaded with optical information at all time-points, each pixel projects only one light beam into the pupil of the viewer in each time cycle for the Maxwellian view display,
or, each pixel projects at least two light beams into the pupil of the viewer in each time cycle for the More-than-one-view-one-pupil display.

22. The optical-waveguide display module with multiple ordinary light sources according to claim 18, wherein the converging device is integrated into the optical waveguide device.

23. The optical-waveguide display module with multiple ordinary light sources according to claim 18, wherein the optical-waveguide display module further comprises an auxiliary relay device, which is inserted into the light path to modulate the incident light of the optical waveguide device.

24. The optical-waveguide display module with multiple ordinary light sources according to claim 23, wherein the auxiliary relay device is a zooming in/out element, for adjusting the projection size of the light from the ordinary display device.

25. The optical-waveguide display module with multiple ordinary light sources according to claim 23, wherein the auxiliary relay device is a filter module, which projects the spectral plane of the ordinary display device and performs filtering on the spectral plane.

26. The optical-waveguide display module with multiple ordinary light sources according to claim 23, wherein the auxiliary relay device is a guiding device, which guide the light from the ordinary display device to the couple-in element of the optical waveguide device.

27. The optical-waveguide display module with multiple ordinary light sources according to claim 18, wherein the optical-waveguide display module further comprises a compensation unit, which is designed to eliminate the effect of the converging device on the incident light from the external environment.

28. The optical-waveguide display module with multiple ordinary light sources according to claim 18, wherein the optical-waveguide display module further comprises a tracking device connected to the control device, for tracking the spatial position of the viewer's pupil.

29. The optical-waveguide display module with multiple ordinary light sources according to claim 28, wherein according to the real-time spatial position of the pupil, the control device switches on and off the corresponding K ordinary light sources at K time-points of a time cycle, with the ordinary display device refreshed by corresponding optical information synchronously, where $2 \leq K < M$.

30. The optical-waveguide display module with multiple ordinary light sources according to claim 28, wherein according to the real-time spatial position of the pupil at a time-point, a corresponding ordinary light source is switched on by the control device, with the ordinary display device refreshed by corresponding optical information synchronously.

31. The optical-waveguide display module with multiple ordinary light sources according to claim 18, wherein the M ordinary light sources are replaced by the combination of an ordinary light source and a controllable deflection device;
wherein the controllable deflection device can deflect the light from the ordinary light source under control of control device, to provide backlight to the ordinary display device along M directions,
or the controllable deflection device can deflect the light from the ordinary display device into the entrance pupil along M directions.

32. The optical-waveguide display module with multiple light sources according to claim 18, wherein the M orthogonal-characteristic light sources and the relay device are replaced by a controllable deflection device, which can deflect the light from the ordinary display device under control of control device;
wherein a microstructure array consisted of microstructures is attached to the ordinary display device, with the microstructures taking a one-to-one correspondence with the pixels or the subpixels of the display device of orthogonal-characteristic for modulating exit angles and exit directions of the exiting beams;
wherein the ordinary display device is an active self-luminous device, or a passive non-self-luminous device with a backlight;
wherein the optical structure of an ordinary display device/the microstructure array/the controllable deflection device functions as a thin-and-light display device projecting directional light beams.

33. The optical-waveguide display module with multiple ordinary light sources according to claim 25, wherein the M ordinary light sources and the relay device are replaced by M filter apertures on the spectral plane, which are switched on and off sequentially under control of control device at M time-points of each time cycle and only one filter aperture is switched on at a time-point;

wherein the ordinary display device is an active self-luminous device, or a passive non-self-luminous device with a backlight.

34. The optical-waveguide display module with multiple ordinary light sources according to claim 25, wherein the M ordinary light sources and the relay device are replaced by a filter aperture on the spectral plane and a controllable deflection device;

wherein the controllable deflection device can deflect the light from the filter module under control of the control device, to guide the light from the ordinary display device to the entrance pupil along M directions;

wherein the ordinary display device is an active self-luminous device, or a passive non-self-luminous device with a backlight.

* * * * *